United States Patent [19]

Watanuki et al.

[11] Patent Number: 5,699,345

[45] Date of Patent: Dec. 16, 1997

[54] CONGESTION CONTROL METHOD IN ASYNCHRONOUS TRANSFER MODE LOCAL AREA NETWORK

[75] Inventors: Tatsuya Watanuki, Yokohama; Atsushi Kimoto, Hadano; Atsuo Hatono, Yokohama, all of Japan

[73] Assignee: Hitachi, Ltd., Tokyo, Japan

[21] Appl. No.: 630,979

[22] Filed: Apr. 12, 1996

[30] Foreign Application Priority Data

Apr. 13, 1995 [JP] Japan .................. 7-088083

[51] Int. Cl.⁶ ........................................ H04J 1/16
[52] U.S. Cl. ................................ 370/232; 370/235
[58] Field of Search .......................... 370/229, 232, 370/235, 236, 253, 395, 396, 397

[56] References Cited

U.S. PATENT DOCUMENTS

| | | |
|---|---|---|
| 5,448,564 | 9/1995 | Thor .................................. 370/94.1 |
| 5,457,687 | 10/1995 | Newman ............................ 370/85.3 |
| 5,530,695 | 6/1996 | Dighe et al. ........................ 370/17 |
| 5,541,926 | 7/1996 | Saito et al. ........................ 370/94.2 |

*Primary Examiner*—Douglas W. Olms
*Assistant Examiner*—A. Bnimoussa
*Attorney, Agent, or Firm*—Antonelli, Terry, Stout & Kraus, LLP

[57] ABSTRACT

An ATM network includes a plurality of ATM-LANs which are connected through an ATM-WAN, when a source terminal and a destination terminal belong tb separate ATM-LANs connected through the ATM-WAN, the congestion control is performed as follows. When congestion occurs in an ATM-LAN in which the source terminal exists, the congestion control is performed by the BECN mechanism and when congestion occurs in an ATM-LAN other than the ATM-LAN in which the source terminal exists, the congestion control is performed by the FRP mechanism. When the source terminal and the destination terminal exist in the same ATM-LAN, the congestion control is performed by the FECN mechanism. Thus, in the ATM-LAN, cell loss can be suppressed upon occurrence of congestion.

6 Claims, 27 Drawing Sheets

FIG. 1A
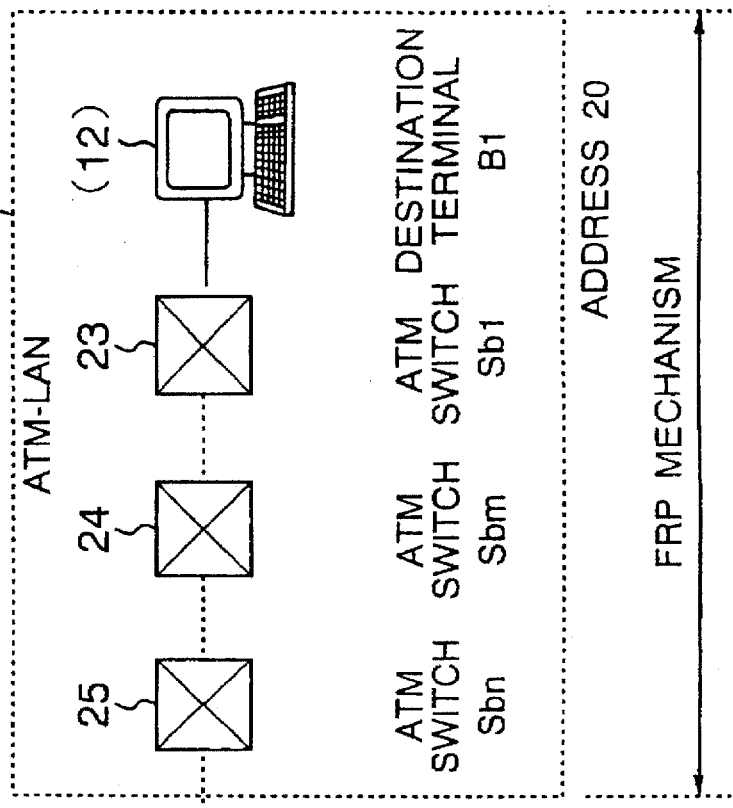
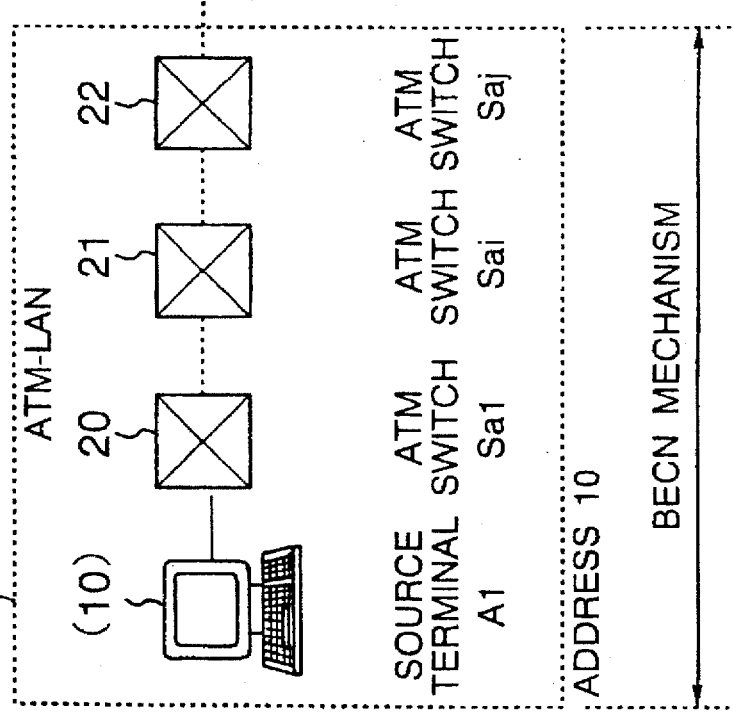

SOURCE TERMINAL AND DESTINATION TERMINAL EXIST SAME ATM-LAN

FIG. 4A

COMMON ADDRESS TABLE IN LAN 1

| TERMINAL | ATM ADDRESS |
|---|---|
| TERMINAL A1 | 10 |
| TERMINAL A2 | 11 |
| ⋮ | ⋮ |

COMMON ADDRESS TABLE IN LAN 2

| TERMINAL | ATM ADDRESS |
|---|---|
| TERMINAL B1 | 20 |
| ⋮ | ⋮ |

ATM CONNECTION MANAGEMENT TABLE

| 90 | 91 | 92 | 93 | 94 | 95 | 96 | 97 | 71 |
|---|---|---|---|---|---|---|---|---|
| INPUT SIDE | | OUTPUT SIDE | | FRP FLAG | CONGESTION SYSTM | DESTINATION TERMINAL ATM ADDRESS | SOURCE TERMINAL ATM ADDRESS | |
| VPI | VPC | VPI | VPC | | | | | |
| ... | ... | ... | ... | ... | ... | ... | ... | |

BECN MECHANISM

FRP MECHANISM

FECN MECHANISM

SET-UP MESSAGE FORMAT FROM TERMINAL A1 TO TERMINAL B1

SET-UP MESSAGE FORMAT FROM TERMINAL A1 TO TERMINAL A2

FIG. 12A ATM CONNECTION MANAGEMENT TABLE OF ATM SWITCH Sai(21)

| INPUT SIDE | | OUTPUT SIDE | | FRP FLAG | CONGESTION SYSTEM | DESTINATION TERMINAL ATM ADDRESS | SOURCE TERMINAL ATM ADDRESS |
|---|---|---|---|---|---|---|---|
| VPI | VPC | VPI | VPC | | | | |
| 100 | 100 | 101 | 101 | 0 | 1 | 20 | 10 |
| 200 | 200 | 201 | 201 | 0 | 3 | 11 | 10 |

FIG. 12B ATM CONNECTION MANAGEMENT TABLE OF ATM SWITCH Sbm(24)

| INPUT SIDE | | OUTPUT SIDE | | FRP FLAG | CONGESTION SYSTEM | DESTINATION TERMINAL ATM ADDRESS | SOURCE TERMINAL ATM ADDRESS |
|---|---|---|---|---|---|---|---|
| VPI | VPC | VPI | VPC | | | | |
| 102 | 102 | 103 | 103 | 0 | 2 | 20 | 10 |

FRP CELL FORMAT (EXAMPLE OF REQUEST CELL)

| FRP TYPE | KIND OF FRP |
|---|---|
| 1 | REQUEST CELL |
| 2 | RECEIVED CELL |
| 3 | ACCEPTED CELL |
| 4 | DENIED CELL |

FIG. 18

ATM CONNECTION MANAGEMENT TABLE EXAMPLE OF ATM SWITCH Sbm (24)

| INPUT SIDE 91 | | OUTPUT SIDE 92 | | FRP FLAG 94 | CONGESTION SYSTEM 95 | ATM ADDRESS OF DESTINATION TERMINAL 96 | ATM ADDRESS OF SOURCE TERMINAL 97 |
|---|---|---|---|---|---|---|---|
| VPI | VPC | VPI | VPC 93 | | | | |
| 102 | 102 | 103 | 103 | 1 | 2 | 20 | 10 |

71 ⌐

90 ⌐

CONGESTION CONTROL METHOD IN ASYNCHRONOUS TRANSFER MODE LOCAL AREA NETWORK

BACKGROUND OF THE INVENTION

The present invention relates to a congestion control method in an asynchronous transfer mode local area network (ATM-LAN).

FIG. 2 schematically illustrates a configuration of a local area network (LAN) structured to operate by the asynchronous transfer mode (ATM) technique. As shown in FIG. 2, an ATM-LAN 1 including ATM switches 20, 21 and 22 and another ATM-LAN 2 including ATM switches 23, 24 and 25 are connected through an ATM-WAN (Wide Area Network) to each other.

The ATM-LAN 1 includes terminals A1(10) and A2(11) and a plurality of ATM switches Sa1 20, . . . , Sai 21, . . . , Saj 22. The terminals A1(10) and A2(11) are connected to the ATM switches Sa1 20 and Saj 22, respectively. Further, the ATM switch Saj 22 is connected to the ATM-WAN 3.

Similarly, the ATM-LAN 2 also includes a terminal B1(12) and a plurality of ATM switches Sbl 23, Sbm 24, ..., Sbn 25. The terminal B1(12) is connected to the ATM switch Sbl 23 and the ATM switch Sbn 25 is connected to the ATM-WAN 3.

An ATM connection is established between the terminals A1 (10) and B1(12) through the ATM switches Sa1 20, . . . , Sai 21, . . . , Saj 22, the ATM-WAN 3, the ATM switches Sbn 25, . . . , Sbm 24, ... Sbl 23, and transmission and reception of data are effected between the terminals A1(10) and B1(12) in a unit referred to as a cell.

In the network structure shown in FIG. 2, it is considered that the terminal A1(10) transfers data to the terminal B1(12). An operation sequence in the case where a backward explicit congestion notification (BECN) mechanism, which is one mechanism for controlling congestion representing an overload state of traffic in the ATM, is adopted now will be described with reference to FIG. 24. In the BECN mechanism, when congestion occurs, a control cell is transmitted to the transmitting source terminal A1 from the ATM switch in which the congestion occurs so that the bandwidth for all areas from the source terminal A1 to the destination terminal B1 is reduced to cope with the congestion.

When a set-up message shown in FIG. 11A is transmitted from the terminal A1(10) to the terminal B1(12) and an ATM connection is set up, the source terminal A1(10) normally transfers data to the destination terminal B1(12) using a bandwidth $\alpha$ (bps) (bit per second) determined upon setting up of the ATM connection as shown in the sequence 1 of FIG. 24.

However, when traffic concentrates on the ATM switch Sai 21 in the ATM-LAN 1 to which the terminal A1(10) belongs due to occurrence of data transfer using an ATM connection set up other than the above-mentioned ATM connection, a buffer in the ATM switch Sai 21 overflows and congestion occurs. Thereupon, the ATM switch Sai 21 transmits a CONTROL cell for informing the source terminals of all ATM connections through its own switch contributing to the occurrence of the congestion. The sequence 2 of FIG. 24 shows that the CONTROL cell is transmitted to the source terminal A1(10).

The terminal A1(10) which has received the CONTROL cell reduces the bandwidth for the ATM connection between the terminal A1(10) and the terminal B1(12) to $\{\alpha\times\gamma$ (bps), $(0<\gamma<1)\}$. Thereafter, the terminal A1(10) transfers data to the terminal B1(12) using the bandwidth $\{\alpha\times\gamma$ (bps), $(0<\gamma<1)\}$ (sequence 3 of FIG. 24). Consequently, traffic to the ATM switch Sai 21 is suppressed and the congestion is eliminated.

Further, in the normal state, when data transfer shown in the sequence 1 of FIG. 24 is made, while congestion occurs in the ATM switch Sbm 24 in the ATM-LAN 2 different from the ATM-LAN 1 to which the terminal A1(10) belongs, as shown in a sequence 4 of FIG. 24, a CONTROL cell is transmitted from the ATM switch Sbm 24 through ATM switches on the side of the source terminal (hereinafter also referred to as the upstream side) and ATM switches of the ATM-LAN 1 to the terminal A1(10).

Thereafter, the terminal A1(10) which has received the CONTROL cell transfers data to the terminal B1(12) by the bandwidth $\{\alpha\times\gamma$ (bps), $(0<\gamma<1)\}$ (sequence 5 of FIG. 24). Consequently, traffic to the ATM switch Sbm 24 is also suppressed and congestion is eliminated.

Referring now to FIG. 25, an operation sequence will be described in the case where the fast reservation protocol (FRP) system, which is another control system in the ATM, is applied to the network structure shown in FIG. 2. In the FRP mechanism, when congestion occurs, a REQUEST cell for broadening the bandwidth on the side of the destination terminal (hereinafter also referred to as the downstream side) is transmitted from the ATM switch in which the congestion occurs and when all of the downstream transmission paths have accepted the request, the bandwidth on the downstream side of the ATM switch in which the congestion occurs is broadened.

As shown in the sequence 1 of FIG. 25, the source terminal A1(10) normally transfers data to the destination terminal B1(12) using the bandwidth $\{\alpha$ (bps)$\}$ determined upon setting up of the ATM connection in the same manner as the above-mentioned BECN mechanism. It is assumed that traffic concentrates on the ATM switch Sai 21 in the ATM-LAN 1 to which the terminal A1(10) belongs and congestion occurs in the same manner as in the BECN mechanism. Thereupon, the ATM switch Sai 21 transmits a request cell for increasing the bandwidth to the ATM switches adjacent on the downstream side of each of the ATM connections in order to increase the bandwidth of all the ATM connections on the downstream side of its own switch. The sequence 2 of FIG. 25 shows that the REQUEST cell is transmitted in order to increase the bandwidth for the ATM connections between the terminal A1(10) and the terminal B1(12) to $\{\alpha+\beta$ (bps)$\}$.

Any ATM switch which has received the REQUEST cell and is disposed downstream of the ATM switch Sai 21 (the ATM switch is not specified in FIG. 25 but is assumed to be designated by 300) transmits a RECEIVED cell responsive to the REQUEST cell to the upstream ATM switch Sai 21. The ATM switch 300 also transmits the REQUEST cell for increasing the bandwidth of the ATM connection to $\alpha+\beta$ (bps) to an ATM switch 301 adjacent on the downstream side thereof when the ATM switch 300 can accept the REQUEST cell. The series of sequences are successively performed by each of the ATM switches until reaching the ATM switch Sbl 23 (the sequence 2 of FIG. 25).

Finally, the REQUEST cell is transmitted from the ATM switch Sbl 23 of the ATM-LAN 2 to the terminal B1(12) which is the destination terminal.

The terminal B1(12) which has received the REQUEST cell transmits an ACCEPTED cell indicative of acceptance of the requested bandwidth to the ATM switch Sbl 23 adjacent on the upstream side of the ATM connection thereof when the terminal B1(12) can accept the request for increasing the bandwidth of the ATM connection to α+β (bps). The ATE switch Sb1 23 which has received the ACCEPTED cell also transmits the ACCEPTED cell to the ATM switch 302 (not shown) adjacent on the upstream side thereof. Thus, the bandwidth of the ATM connection is increased to {α+β (bps)}. The series of sequences are successively performed by each of the ATM switches until reaching the ATM switch Sai 21 (sequence 3 of FIG. 25).

Finally, the ATM switch Sai 21 receives the ACCEPTED cell and increases the bandwidth of the ATM connection thereof to {α+β (bps)}. Hereinafter, the terminal A1(10) transfers data by the bandwidth {α (bps)} as it is while data is transferred by the bandwidth {α+β (bps)} at the section from the ATM switch Sai 21 of the ATM-LAN 1 to the terminal B1(12) of the ATM-LAN 2 (sequence 4 of FIG. 25). Consequently, the bandwidth from the ATM switch Sai 21 is increased, and congestion at the ATM switch Sai 21 is eliminated.

Further, in the normal state, when data transfer shown in the sequence 1 of FIG. 25 is made, while congestion occurs in the ATM switch Sbm 24 of the ATM-LAN 2 different from that including the terminal A1(10) as shown in the sequences 5 and 6 of FIG. 25, the same congestion control as above is made. That is, the request cell is transmitted from the ATM switch Sbm 24 in the ATM-LAN 2 through the downstream ATM switch to the terminal B1(12) successively and consequently the ACCEPTED cell is transmitted from the terminal B1(12) to the ATM switch Sbm 24 successively, so that the switch Sbm 24 transfers data by the bandwidth {α+β (bps)}.

Accordingly, the terminal A1(10) transfers data by the bandwidth {α (bps)} at it is, while data transfer is made by the bandwidth {α+β (bps)} at the section from the ATM switch Sbm 24 of the ATM-LAN 2 to the terminal B1(12) (sequence 7 of FIG. 25). Thus, the congestion at the ATM switch Sbm 24 is also eliminated.

Such an FRP mechanism has been disclosed in "A Reservation principle with applications to the ATM traffic control", Computer Networks and ISDN systems, Vol. 24, 1992, pp. 321–334.

Referring now to FIG. 26, an operation sequence will be described in the case where the forward explicit congestion notification (FECN) mechanism, which is still another congestion control system in the ATM, is applied to the network structure shown in FIG. 2. In the FECN mechanism, when congestion occurs, the payload type indication (PT) in a cell header relayed from the ATE switch to the terminal B1 is changed to "congested" the destination terminal B1 which has received the PT indication transmits the control signal to the source terminal A1, which reduces the bandwidth on which to transmit data.

As shown in the sequence 1 of FIG. 26, the source terminal A1(10) normally transfers data to the destination terminal B1(12) using the bandwidth {α (bps)} determined upon setting up of the ATM connection in the same manner as the BECN mechanism.

At this time, it is assumed that traffic concentrates on the ATM switch Sai 21 in the ATM-LAN 1 including the terminal A1(10) and congestion occurs in the same manner as in the BECN mechanism. In this case, the ATM switch Sai 21 resets the PT indication in the header of the received cell to "congestion experienced" and relays it downstream in order to inform the destination terminals of all the ATM connections within its own switch of the occurrence of the congestion. The sequence 2 of FIG. 26 shows that the PT indication in the header of the cell transferred in the ATM connection between the terminal A1(10) and the terminal B1(12) is set to "congestion experienced" and is relayed.

The terminal B1(12) which has received the cell transmits the CONTROL cell for indicating the occurrence of congestion to the source terminal A1(10) (sequence 3 of FIG. 26).

The terminal A1(10) which has received the CONTROL cell reduces the bandwidth of the ATM connection thereof to {α×γ (bps), (0<γ<1)}. Hereinafter, the terminal A1(10) transfers data to the terminal B1(12) using the bandwidth {α×γ (bps), (0<γ<1)} (sequence 4 of FIG. 26). Thus, the traffic to the ATM switch Sai 21 is suppressed and congestion is eliminated in the same manner as in the BECN mechanism.

Further, when the data transfer shown in the sequence 1 of FIG. 26 is normally made, while congestion occurs in the ATM switch Sbm 24 within the ATM-LAN 2 different from that including the terminal A1(10) as shown in the sequences 5 and 6 of FIG. 26, the same congestion control as above is made.

Hereinafter, the terminal A1(10) transfers data to the terminal B1(12) using the bandwidth {α×γ (bps), (0<γ<1)} (sequence 7 of FIG. 26). Consequently, the traffic to the ATM switch Sbm 24 is also suppressed and congestion is eliminated.

The BECN mechanism, the FRP mechanism and the FECN mechanism are disclosed in "The Rate-Based Flow Control Framework for the Available Bit Rate ATM Service", IEEE Network, March/April 1995, pp. 25–39.

Each of these congestion control systems have been heretofore in the ATM-LAN independently.

It is apparent from the operation sequence of FIG. 24 that in the BECN mechanism, when congestion occurs in the ATM switch, such as the ATM switch Sai 21 in the ATM-LAN 1 which is relatively near to the source terminal, the cell transfer delay required until the CONTROL cell reaches the source terminal is small. Accordingly, the delay time required until the source terminal reduces the bandwidth for the call may be made small. Consequently, the time required until traffic to the call is suppressed can be also made small and any vanishing of the cells due to occurrence of congestion can be reduced.

However, when congestion occurs in the ATM switch, such as the ATM switch Sbm 24 in the ATM-LAN 2 located at a distant place from the source terminal via the ATM-WAN 3, the cell transfer delay required until the CONTROL cell reaches the source terminal is increased. Accordingly, the delay time required until the source terminal reduces the bandwidth becomes large. Consequently, some of cells sent before the bandwidth is reduced are lost. It is necessary to re-transmit the lost cells and the efficiency of data transfer is deteriorated.

In the FRP mechanism, as apparent from the operation sequence of FIG. 25, the request for increasing the bandwidth must be accepted by all the ATM switches from the ATM switch in which congestion occurs to the destination terminal.

Accordingly, in contrast with the BECN mechanism, when congestion occurs in the ATM switch, such as the ATM switch Sbm 24 in the ATM-LAN 2 located at a distant place from the source terminal via the ATM-WAN 3, that is, at a near place to the destination terminal, the number of ATM switches on the way is small and accordingly the probability that the request for increasing the bandwidth will be reduced. Accordingly, the bandwidth can be increased with high probability and the processing time required for the congestion control is also small. Consequently, congestion can be eliminated and the cell loss can be reduced.

When congestion occurs in the ATM switch, such as the ATM switch Sai 21 in the ATM-LAN 1 located at a relatively near place to the source terminal, that is, at a distant place from the destination terminal, the probability that the request for increasing the bandwidth will be blocked is increased greatly. Accordingly, the bandwidth is not increased and congestion is not eliminated. Consequently, cell loss occurs frequently and retransmission of data occurs. Further, even if the request for increasing the bandwidth is attained successfully, the processing time required for the congestion control thereof is increased and loss of calls occurs.

In the FECN mechanism, as apparent from the operation sequence of FIG. 26, when congestion occurs in an ATM switch, such as the ATM switch Sbm 24 in the ATM-LAN 2 located at a distant place from the source terminal via the ATM-WAN, that is, at a place near to the destination terminal, the cell transfer delay for informing the destination terminal of congestion is small. Accordingly, the cell transfer delay required until the destination terminal transmits the CONTROL cell to the source terminal becomes small and the delay time required until the source terminal reduces the bandwidth of the call also becomes small. Consequently, the time required until congestion is eliminated also becomes small and loss of cells can be reduced.

However, when congestion occurs in an ATM switch, such as the ATM switch Sai 21 in the ATM-LAN 1 located at a relatively near place to the source terminal, that is, at a distant place from the destination terminal, the cell transfer delay for informing the destination terminal of the congestion becomes large. Accordingly, the cell transfer delay required until the destination terminal transmits the CONTROL cell to the source terminal becomes large. Consequently, the delay time required until the source terminal reduces the bandwidth of the call becomes large and cell loss occurs frequently.

Further, in the FECN mechanism, occurrence of congestion is first communicated to the destination terminal and is then communicated to the source terminal. Accordingly, when the distance between the source terminal and the destination terminal is long, the delay time for informing the source terminal of occurrence of congestion is increased and the delay time required until the source terminal reduces the bandwidth is increased. Consequently, cell loss occurs frequently.

In the FECN system, "congestion experienced" is merely set in the PT indicator within the header of the cell to be relayed in the ATM switches and accordingly the FECN mechanism is a congestion control system having a very light load.

On the contrary, in the BECN mechanism, the ATM switches prepare the CONTROL cell and must transmit it to the source terminal. Accordingly, when the ATM switch detects congestion, implementation of the BECN mechanism for all calls within its own switch becomes a very heavy load.

SUMMARY OF THE INVENTION

It is an object of the present invention to provide an effective congestion control system in which the above drawbacks of the conventional congestion control systems in the ATM-LAN are removed.

In order to solve the above problems in the prior art, according to the present invention, all of the BECN mechanism, the FRP mechanism and the FECN mechanism are available in each of the ATM switches and in each of the terminals as a congestion control system.

Further, according to the present invention, the congestion control systems provided as described above are used properly in the case where the source terminal 10 and the destination terminal 12 belong to separate ATM-LANs (FIG. 1A) and in the case where the source terminal 10 and the destination terminal 11 are connected to the same ATM-LAN (FIG. 1B). In addition, even when the source terminal 10 and the destination terminal 12 belong to separate ATM-LANs, the congestion control systems are used properly in the case where congestion occurs in the ATM-LAN 1 including the source terminal 10 and in the case where congestion occurs in the ATM-LAN 2 other than the ATM-LAN 1 including the source terminal 10.

As shown in FIG. 1A, when the source terminal 10 and the destination terminal 12 belong to separate ATM-LANs and congestion occurs in the ATM switches Sal to Saj in the ATM-LAN 1 including the source terminal 10, the congestion is controlled by the BECN mechanism. Further, when congestion occurs in the ATM switches Sb1 to Sbn in the ATM-LAN 2 other than the ATM-LAN 1 including the source terminal 10, the congestion is controlled by the FRP mechanism. In addition, as shown in FIG. 1B, when the source terminal 10 and the destination terminal 11 belong to the same ATM-LAN 1, the congestion is controlled by the FECN mechanism.

In order to realize the above object, the present invention comprises congestion control information memory means, for registering the congestion control system selected, in each of the ATM switches and congestion control processing means for controlling congestion on the basis of information stored in the congestion control information memory means of each ATM switch.

According to the present invention, when the source terminal 10 and the destination terminal 12 belong to the separate ATM-LANs, there is registered in the congestion control information memory means in the ATM switches Sa1 to Saj of the ATM-LAN 1, which includes the source terminal 10, that the BECN mechanism is selected as the congestion control system for the ATM connection. Accordingly, when congestion occurs in the ATM switch in the ATM-LAN 1 which includes the source terminal 10, the congestion control processing means in the ATM switch in which congestion is detected performs the BECN mechanism for the ATM connection.

In this case, since the distance between the source terminal 10 and the ATM switch in which congestion occurs is short, the delay time required until the occurrence of congestion is communicated to the source terminal 10 can be made small. Consequently, the delay time required until the congestion is eliminated can be made small and cell loss can be reduced.

Further, when the source terminal 10 and the destination terminal 12 belong to separate ATM-LANs, there is registered in the congestion control information memory means in the ATM switches Sb1 to Sbn of the ATM-LAN 2, which includes the source terminal 10 that the FRP mechanism is selected as the congestion control system for the ATM connection. Accordingly, when congestion occurs in the ATM switches Sb1 to Sbn of the ATM-LAN 2 which includes the source terminal 10, the congestion control processing means in the ATM switch performs the FRP mechanism for the ATM connection.

In this case, since the distance between the destination terminal 12 and the ATM switches Sb1 to Sbn in which congestion occurs is short, the probability of increase of the bandwidth is very high and the processing time required for the congestion control is also small. As a result, the congestion can be eliminated and cell loss can be reduced.

In addition, when the source terminal 10 and the destination terminal 11 belong to the same ATM-LAN 1, there is registered in the congestion control information memory means in the ATM switches Sa1 to Saj of the ATM-LAN 1 that the FECN mechanism is selected as the congestion control system for the ATM connection. Accordingly, when congestion occurs in the ATM switch of the ATM-LAN 1 or 2, the congestion control processing means in the ATM switch performs the FECN mechanism for the ATM connection.

In this case, the ATM switch merely performs the congestion control having a light load. Further, since the distance between the source terminal 10 and the destination terminal 11 is short, the delay time required until the occurrence of congestion is communicated to the source terminal 10 can be made small. Consequently, the delay time required until the congestion is eliminated can be made small and cell loss can be reduced.

BRIEF DESCRIPTION OF THE DRAWINGS

FIGS. 1A and 1B schematically illustrate a congestion control system according to the present invention;

FIGS. 4A and 4B show the structure of address tables in an ATM-LAN in an embodiment of the present invention;

FIG. 5 shows a format of an ATM connection management table in the ATM switch in the embodiment of the present invention;

FIGS. 12A and 12B show definite examples of the ATM connection management tables in the ATM switch in the embodiment of the present invention;

FIG. 18 shows an example of an ATM connection management table in the ATM switch Sbm in the embodiment of the present invention;

DESCRIPTION OF THE PREFERRED EMBODIMENTS

Figure 2:
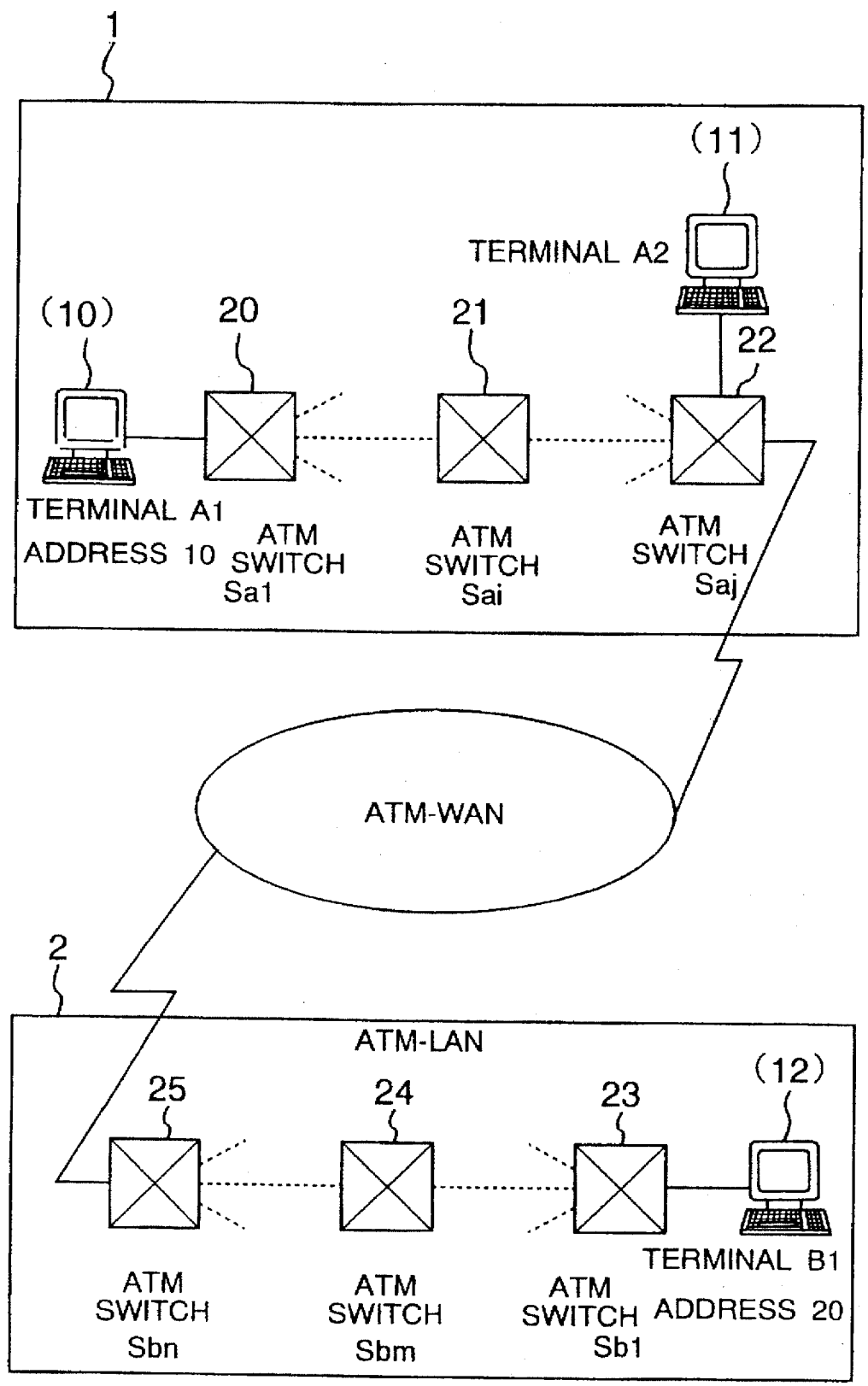
FIG. 2 is a diagram showing an example of a network structure constructed by the ATM technique.

In the network structure of FIG. 2, each of terminals is assigned an ATM address for identifying the terminal. For example, "10" is assigned to a terminal A1(10), "11" to a terminal A2(11), and "20" to a terminal B1(12).

Figure 3:
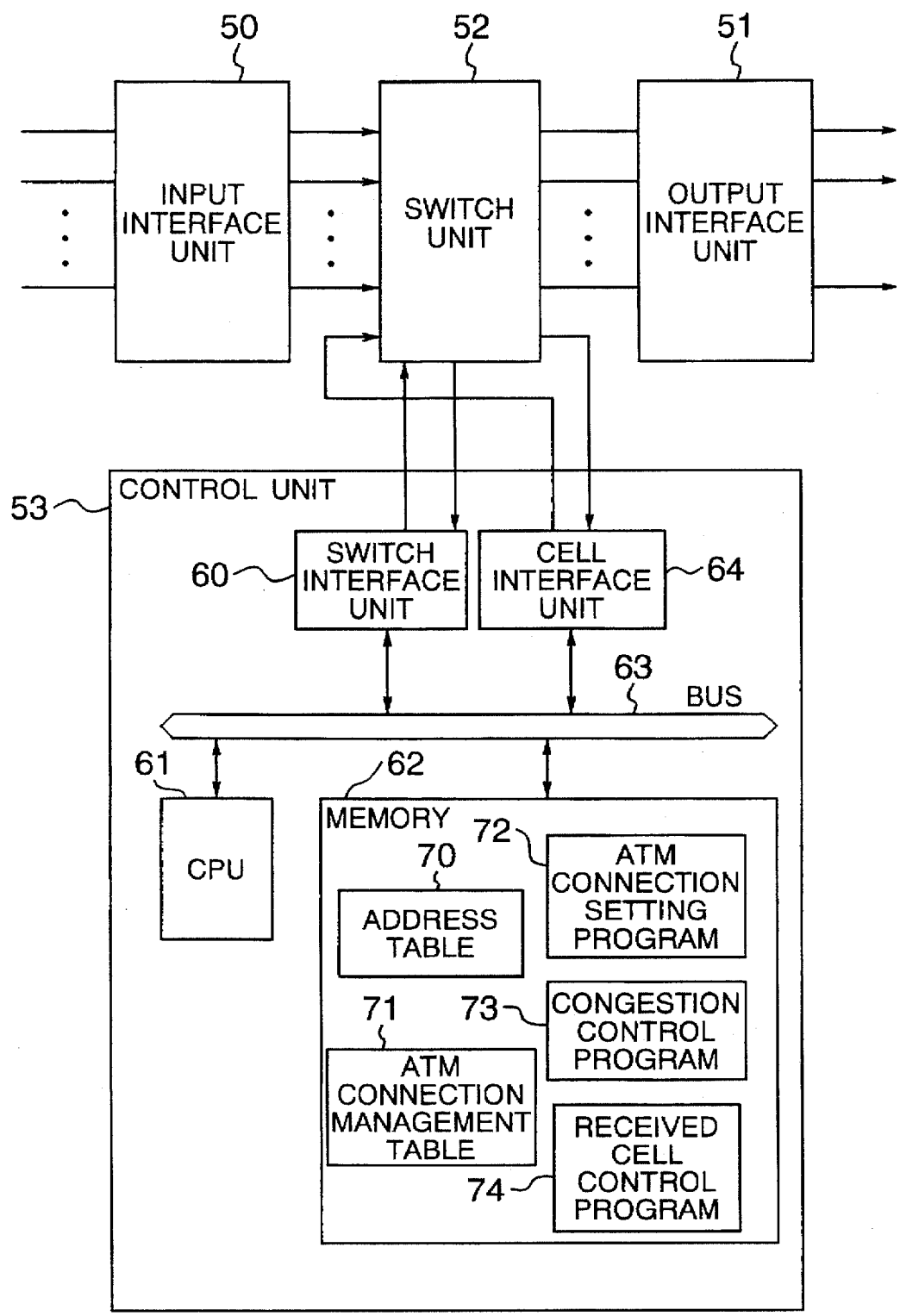
FIG. 3 is a block diagram schematically illustrating an ATM switch according to the present invention.

FIG. 3 is a functional block diagram schematically illustrating an ATM switch according to the present invention. As shown in FIG. 3, the ATM switch of the present invention comprises an input interface unit 50 for receiving a cell from the network, an output interface unit 51 for transmitting a cell to the network, a switch unit 52 for relaying a received cell, and a control unit 53 for controlling these whole units.

The control unit 53 includes a switch interface unit 60 for controlling interface with the switch unit 52 when the switch unit 52 is controlled, a central processing unit (CPU) 61 for performing congestion control and the like, a memory 62, a cell interface unit 64 for controlling interface with the switch unit when a special cell, such as a CONTROL cell, is received or transmitted, and a bus 63 for connecting the above units with one another.

The memory 62 stores an address table 70 in which ATM addresses of all terminals in the ATM-LAN to which the ATM switch belongs are registered, an ATM connection management table 71 for managing the ATM connection in the ATM switch, an ATM connection setting program 72 performed by the CPU upon setting of the ATM connection, a congestion control program 73 performed by the CPU, and a RECEIVED cell control program 74 performed by the CPU when a special cell, such as the CONTROL cell, is received.

FIGS. 4A and 4B show an example of the address tables 70 stored in the memory of each of the ATM switches. All of the ATM switches belonging to the ATM-LAN 1 hold the address table 70-1 shown in FIG. 4A in the memory 62 and all of the ATM switches belonging to the ATM-LAN 2 hold the address table 70-2 shown in FIG. 4B in the memory 62. Addresses of the terminals connected to the ATM-LAN to which the ATM switches belong are stored in the address table 70.

FIG. 5 shows a format of an ATM connection management table 71 stored in the memory 62 of the ATM switch. The ATM connection management table 71 includes input side virtual path identifiers (VPI) 90, input side virtual channel identifiers (VCI) 91, output side VPIs 92, output side VCIs 93, FRP flags 94, congestion systems 95, source terminal ATM addresses 96 and destination terminal ATM addresses 97.

The VPI 90 is an input side virtual path identifier determined between adjacent ATM switches or terminals upon setting of the ATM connection and the VCI 91 is an input side virtual channel identifier determined between adjacent ATM switches or terminals upon setting of the ATM connection. The output side VPI 92 and VCI 93 are an output side virtual path identifier and virtual channel identifier, respectively, determined between adjacent ATM switches or terminals upon setting of the ATM connection.

The FRP flag 94 indicates whether the request for increase of the bandwidth by the FRP mechanism is being made to the ATM connections or not and is set to "0" when the request for increase of the bandwidth is not made and to "1" when the request for increase of the bandwidth is being made. Upon initialization, the FRP system 94 is set to "0".

The congestion system 95 indicates the congestion control system performed upon occurrence of congestion for the ATM connections. The congestion system 95 is set to "1" when the BECN mechanism is selected, to "2" when the FRP mechanism is selected and to "3" when the FECN mechanism is selected.

The source terminal ATM address 96 and the destination terminal ATM address 97 store ATM addresses of source terminals and destination terminals of the ATM connections, respectively.

Figure 6:
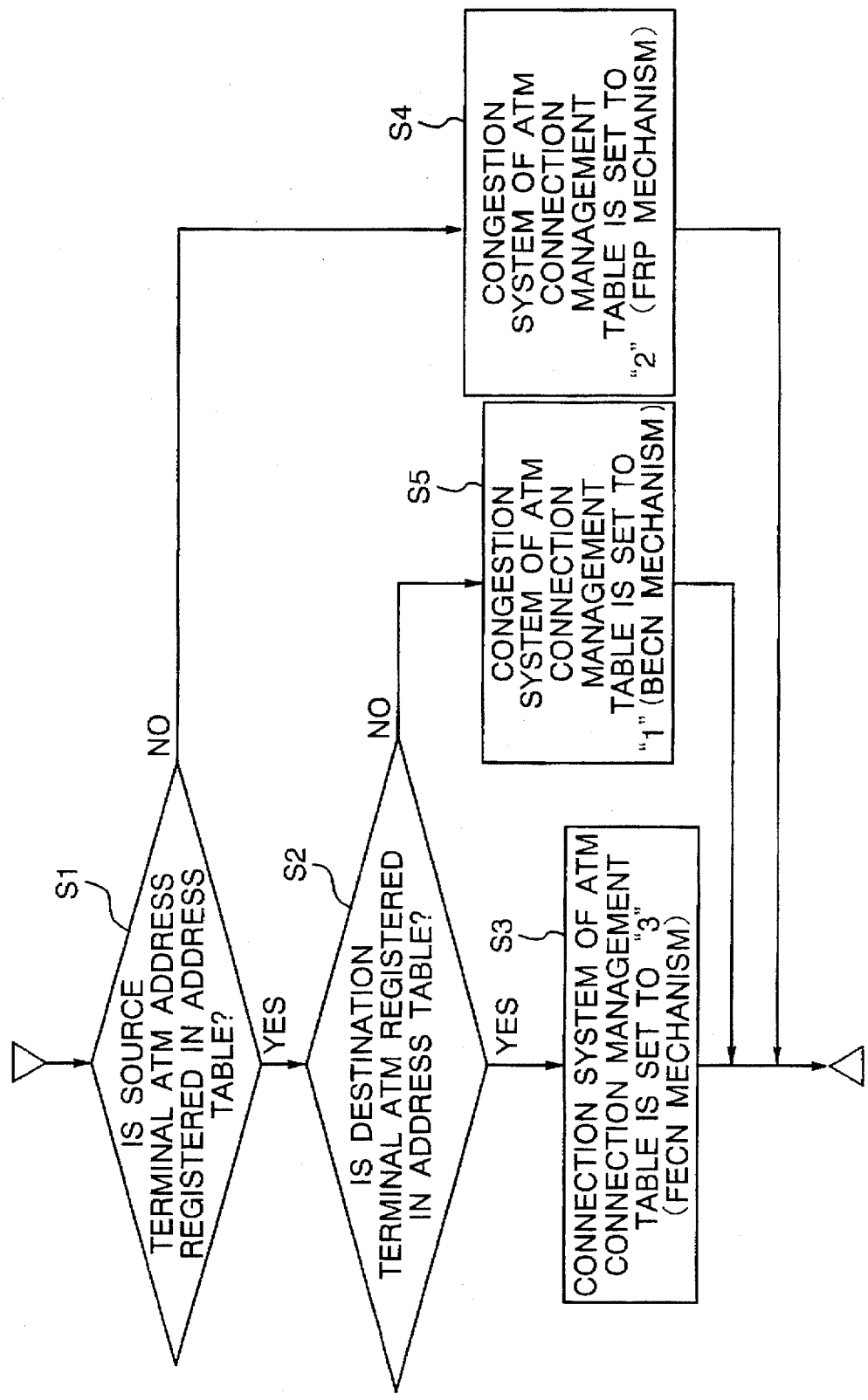
FIG. 6 is a flow chart for showing operation of an ATM connection setting program in the ATM switch in the embodiment of the present invention.

FIG. 6 shows an operation flow diagram of the ATM connection setting program 72. When the CPU 61 in the ATM switch receives a set-up message for requesting the setting of the ATM connection, the CPU detects a source terminal ATM address and judges whether this address is registered in its own address table 70 or not so that the CPU judges whether it is transmitted from the ATM-LAN including the ATM switch or not. When it is registered, the process proceeds to step S2 and when it is not registered, the process proceeds to step S4 (step S1).

When the set-up message is transmitted from the ATM-LAN including the ATM switch, the CPU judges whether the ATM address of the destination terminal is registered in its own address table or not so that the CPU judges whether setting of the ATM connection is a setting in the ATM-LAN to which the ATM switch belongs or not. When registered, the process proceeds to step S3 and when not registered, the process proceeds to step S5 (step S2).

In step S2, when the CPU judges that it is registered, the request is identified as a request for the setting of an ATM connection for a message to be transmitted and received in the same ATM-LAN to which the ATM switch belongs. Accordingly, the congestion system 95 in the ATM connection management table 71 is set to "3" (FECN mechanism) (step S3) and the ATM connection setting process is finished.

In step S1, when it is judged that the source terminal belongs to another ATM-LAN, the congestion system 95 in the ATM connection management table 71 is set to "2" (FRP mechanism) (step S4) and the ATM connection setting process is finished.

In step S2, when it is judged that the destination terminal does not belong to the ATM-LAN to which the ATM switch belongs, that is, when it is judged that the destination terminal belongs to another ATM-LAN, the congestion system 95 in the ATM connection management table 71 is set to "1" (BECN mechanism) (step S5) and the ATM connection setting process is finished.

Figure 7:
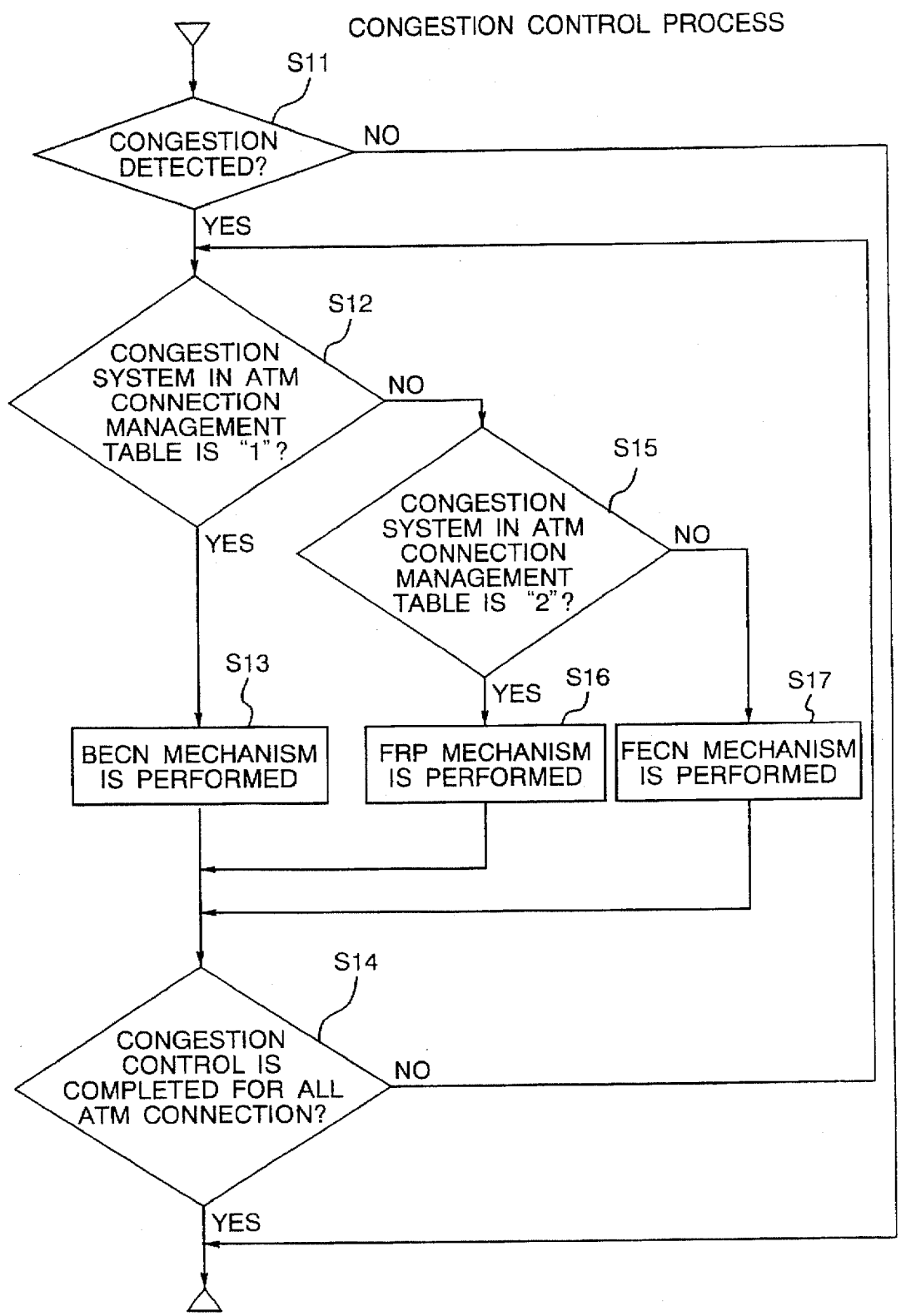
FIG. 7 is a flow chart showing operation of a congestion control program in the ATM switch in the embodiment of the present invention.
Figure 8A:
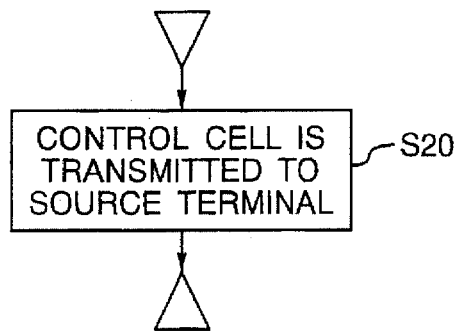
FIGS. 8A, 8B and 8C are flow charts showing operations in the ATE switches of the systems in the embodiment of the present invention.

FIG. 7 shows an operation flow of the congestion control program 73. When the CPU 61 in the ATM switch detects congestion (step S11), the CPU refers to the congestion system 95 in the ATM connection management table 71 and judges whether the congestion system is "1" or not (step S12). As the result of the reference, when the congestion system is "1", the congestion process of the BECN mechanism, in which the CONTROL cell is transmitted to the source terminal as shown in FIG. 8A, (step S20) is performed (step S13). Then, it is judged whether the congestion process is completed for all ATM connections or not (step S14) and when it is completed, the congestion control process is finished. When it is not completed, the process is returned to step S12 and the congestion process for a next ATM connection is performed.

Figure 8B:
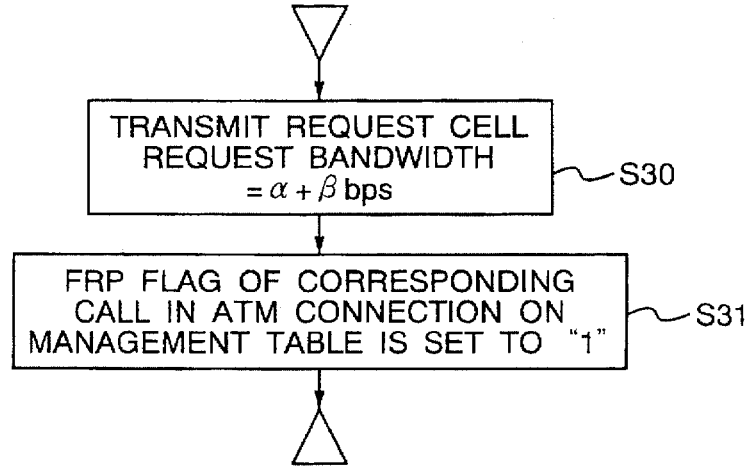

In step S12, when the congestion system 95 in the ATM connection management table 71 is not "1", it is judged whether the congestion system is "2" or not (step S15). When it is "2", the CPU 61 transmits the request cell to request setting the bandwidth to {α+β (bps)} as shown in FIG. 8B to the downstream side (step S30) and the congestion control process of the FRP mechanism in which the FRP flag 94 of a corresponding ATM connection in the ATM connection management table 71 is set to "1" (step S31) is performed (step S16). Then, the process proceeds to step S14.

Figure 8C:
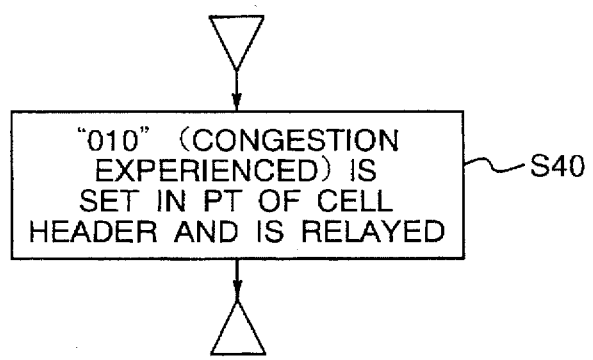

In step S15, when it is judged that the congestion system is not "2", the congestion process of the FECN mechanism, in which "010" (congestion experienced) is set in the PT indicator in the RECEIVED cell header as shown in FIG. 8C and is relayed to the downstream side (step S40), is performed (step S17) and then the process proceeds to step S14.

Figure 9:
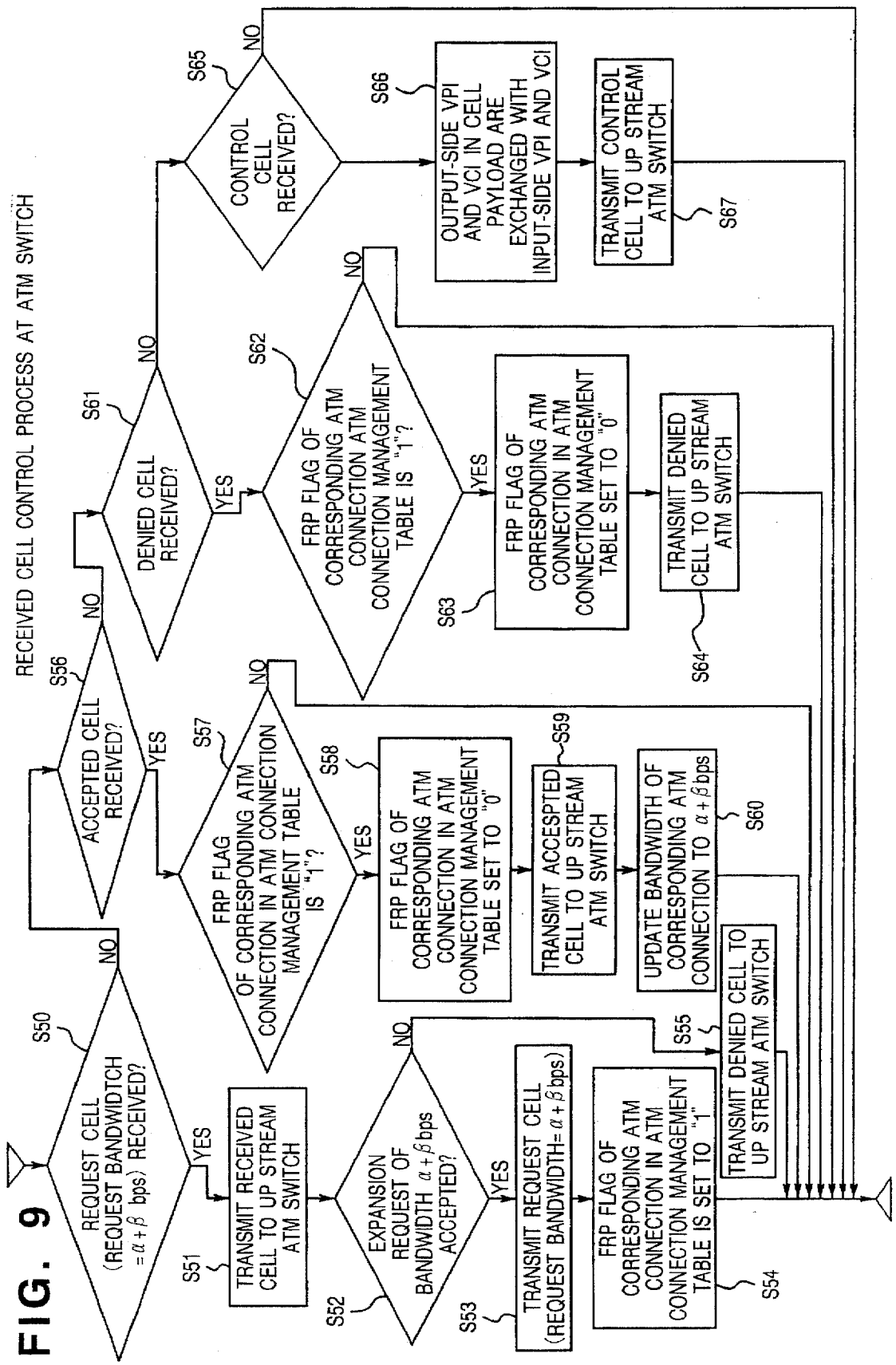
FIG. 9 is a flow chart showing operation of a RECEIVED cell control program in the ATM switch in the embodiment of the present invention.

FIG. 9 shows an operation flow of a RECEIVED cell control program 74 in the ATM switch. When the CPU 61 of the ATM switch receives a cell, the CPU judges whether the REQUEST cell {request bandwidth: α+β (bps)} for requesting expansion of the bandwidth is received or not (step S50). When the REQUEST cell is received, the RECEIVED cell is transmitted to the upstream ATM switch (step S51) and then it determined whether the request for expansion of the bandwidth can be received or not (step S52). When the increase in the bandwidth can be accepted as requested, the REQUEST cell (transmission request bandwidth: {α+β (bps)}) is transmitted to the downstream side (step S53). Then, the FRP flag 94 of the corresponding ATM connection in the ATM connection management table 71 is set to "1" (step S54) and the reception process is finished.

In step S52, when it is judged that the request for expansion request of the bandwidth cannot be accepted, a DENIED cell rejecting the expansion request is transmitted to the upstream ATM switch (step S55) and the process is finished.

In step S50, when it is judged that the RECEIVED cell is not a REQUEST cell, it is judged whether the RECEIVED cell is an ACCEPTED cell (step S56). When it is an ACCEPTED cell, it is judged whether the FRP flag 94 of the corresponding ATM connection in the ATM connection management table 71 is "1" or not (step S57). When the FRP flag 94 is "1", the FRP flag 94 of the corresponding ATM connection in the ATM connection management table 71 is set to "0" (step S58) and an ACCEPTED cell is transmitted to the upstream ATM switch (step S59). Thereafter, the bandwidth of the corresponding ATM connection is increased to α+β (bps) (step S60) and the RECEIVED cell control program is finished.

In step S56, when the RECEIVED cell is not an ACCEPTED cell, it is judged whether it is a DENIED cell or not (step S61). When the RECEIVED cell is a DENIED cell, it is judged whether the FRP flag 94 of the corresponding ATM connection in the ATM connection management table 71 is "1" or not (step 62). When the FRP flag 94 is "1", the FRP flag 94 of the corresponding ATM connection in the ATM connection management table 71 is set to "0" (step S63) and the DENIED cell is transmitted to the upstream ATM switch (step S64). Then, the RECEIVED cell control program is finished. In step S62, when the FRP flag 94 of the corresponding ATM connection in the ATM connection management table 71 is not "1", the RECEIVED cell control program is finished.

In step S61, when the RECEIVED cell is not a DENIED cell, it is judged whether a CONTROL cell is received or not (step S65). When the RECEIVED cell is a CONTROL cell, the output-side VPI and VCI in the payload of the cell are changed to the input-side VPI and VCI, respectively (step S66). Then, the CONTROL cell is transmitted to the upstream ATM switch (step S67) and the RECEIVED cell control program is finished. Further, in step S65, when it is Judged that the RECEIVED cell is not a control cell, the RECEIVED cell control program is finished.

Figure 10:
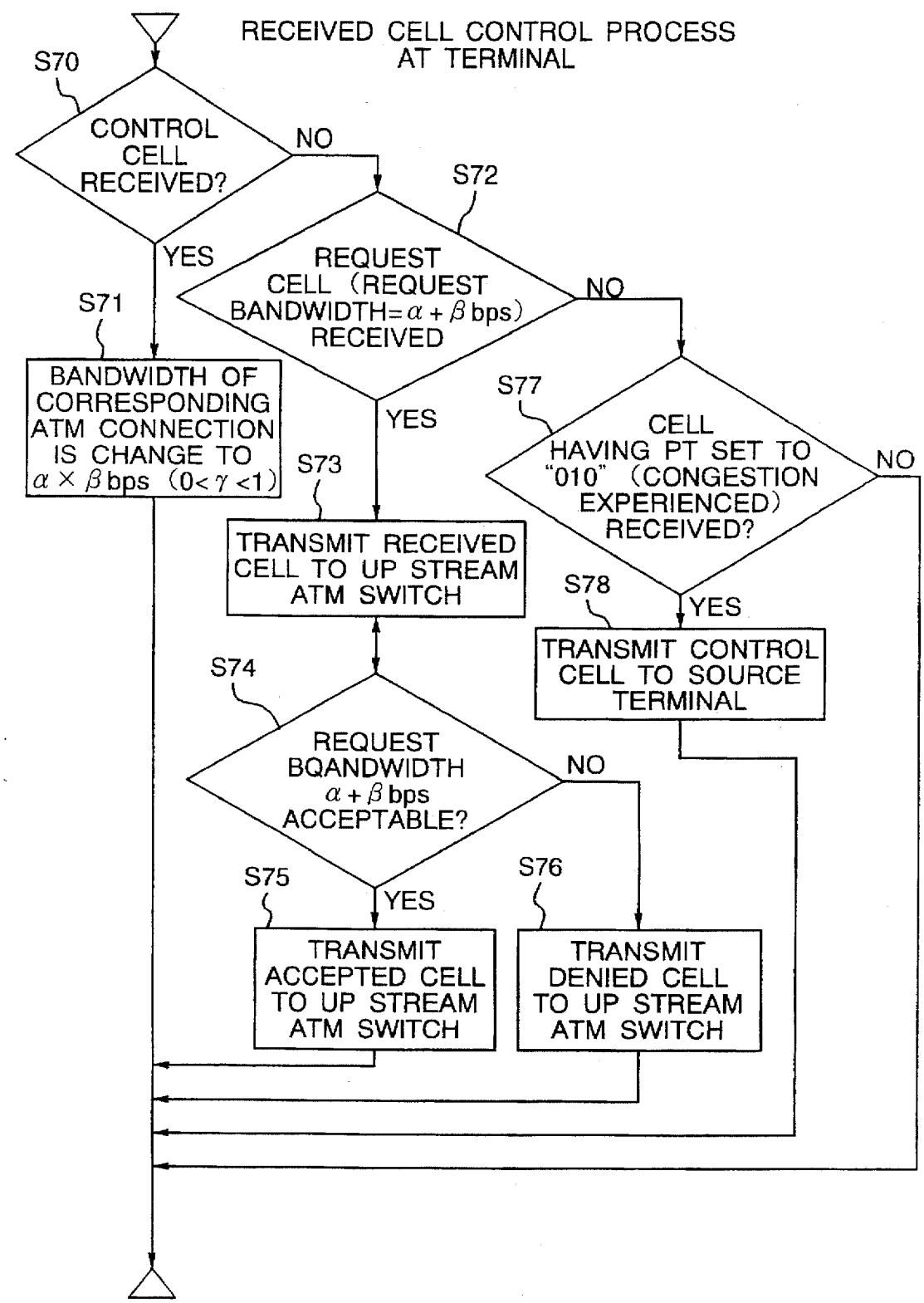
FIG. 10 is a flow chart showing operation of a received cell control program in a terminal performed for each reception of cell in the embodiment of the present invention.

FIG. 10 shows an operation flow of a program executed each time a terminal receives a cell. When a terminal receives a cell, the CPU of the terminal judges whether the RECEIVED cell is a CONTROL cell or not (step S70). When a CONTROL cell is received, the bandwidth of the corresponding ATM connection is changed to {α×β (bps), 0<γ<1} to reduce the bandwidth and the transmission process is performed (step S71). Then, the cell receiving process is finished. When the received cell is not a CONTROL cell, it is judged whether the RECEIVED cell is a REQUEST cell requesting expansion of the bandwidth to α+β (bps) or not (step S72). When it is a REQUEST cell, the RECEIVED cell is transmitted to the upstream ATM switch (step S74) and then it is judged whether the request for expansion of the bandwidth can be accepted or not (step S74). When it is acceptable, the ACCEPTED cell is transmitted to the upstream ATM switch (step S75) and the cell receiving process is finished. In step S74, when it is judged that the request for expansion of the bandwidth cannot be accepted, a DENIED cell is transmitted to the upstream ATM switch (step S76) and the cell receiving process is finished.

In step S72, when it is judged that the RECEIVED cell is not a REQUEST cell, the PT of the RECEIVED cell is read out and whether the PT is "010" (congestion experienced) or not is judged (step S77). When the Pt is "010", the CONTROL cell is transmitted to the source terminal (step S78) and the process is finished. Further, in step S77, when it is judge that the PT is "010", the process is finished as it is.

Figure 1B:
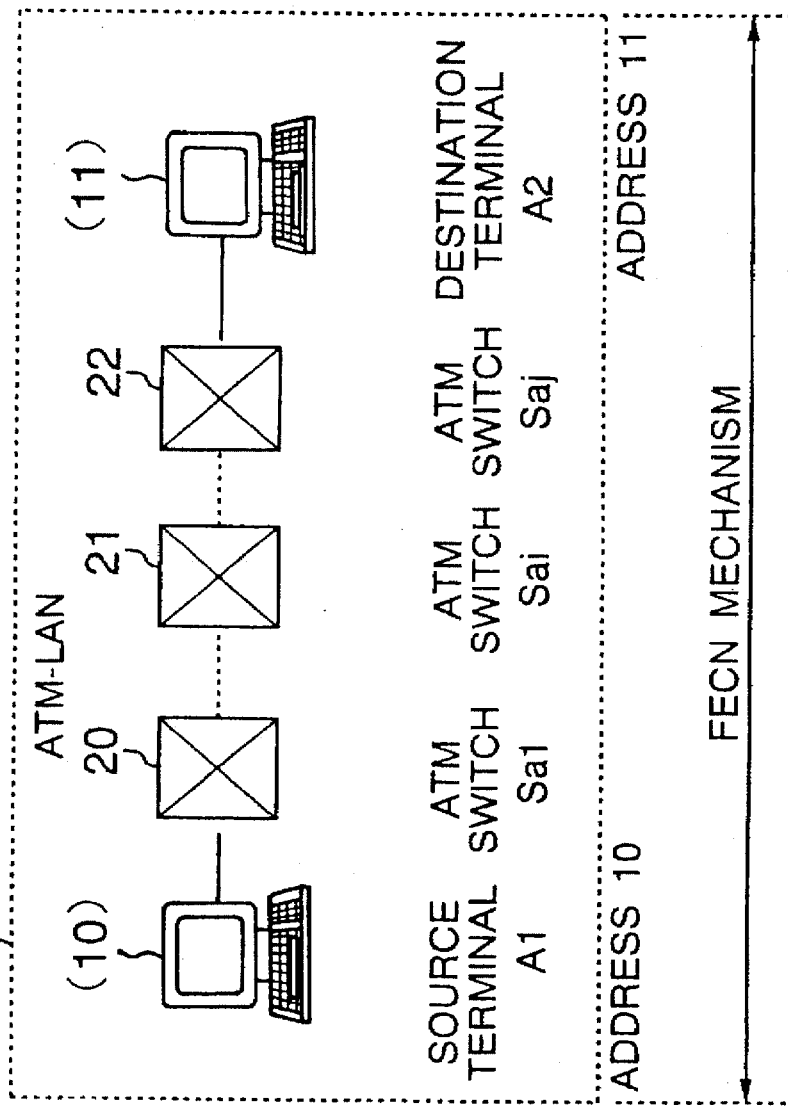

With reference to the above description, communication between the terminals A1(10) and B1(12) (FIG. 1A) and communication between the terminals A1(10) and A2(11) (FIG. 1B) in the network structure shown in FIG. 1 will be now described.

[Operation Upon setting of ATM connection]

First of all, operation of setting the ATM connection between the terminals A1(10) and B1(12) and between the terminals A1(10) and A2(11) will be described.

Figure 11A:
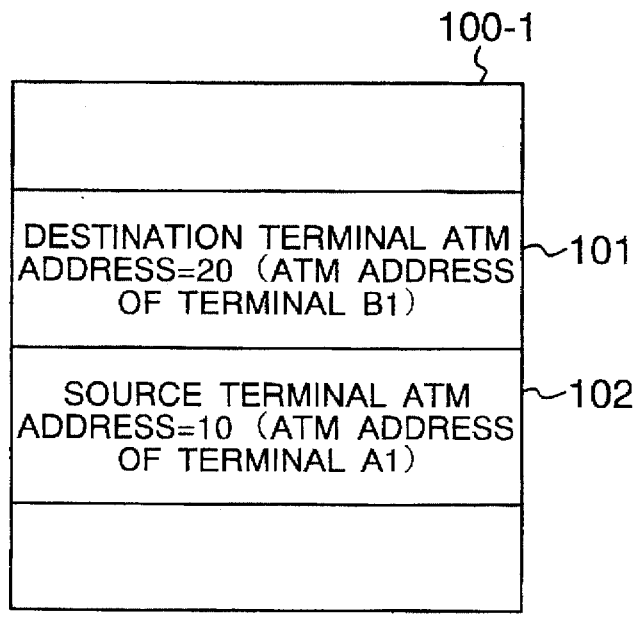
FIGS. 11A and 11B show formats of set-up messages in the embodiment of the present invention.
Figure 11B:
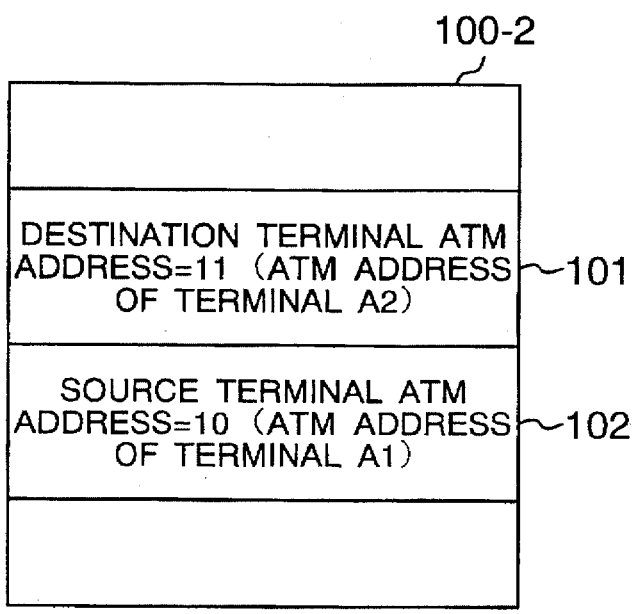

An example of the format of a set-up message (100) used upon setting of the ATM connection is shown in FIG. 11. FIG. 11A shows an example of a set-up message 100-1 used when the ATM connection is set up between the terminals A1(10) and B1(12), that is, between different ATM-LANs. FIG. 11B shows an example of a set-up message 100-2 used when the ATM connection is set up between the terminals A1(10) and A2(11), that is, within the same ATM-LAN. The set-up message 100 includes the ATM address 101 of the destination terminal and the ATM address 102 of the source terminal. The set-up message 100 is transmitted from the source terminal A1(10) to the destination terminal B1(12) or terminal A2(11) upon setting of the ATM connection and is received by the ATM switch on the way.

The CPU 61 in the ATM switch which has received the set-up message performs the ATM connection setting program 72 shown in FIG. 6. The CPU 61 searches the address table 70 to examine whether the source terminal and the destination terminal of the set-up message 100 belong to the same ATM-LAN as that of the CPU on the basis of the received set-up message 100 and selects the congestion control system on the basis of its result. At this time, the CPU 61 sets up data for the ATM connection to the ATM connection management table 71.

The specific procedure now will be described. FIG. 12A shows contents of the ATM connection management table 71 of the ATM switch Sai 21 after the ATM connection has been established between the terminals A1(10) and B1(12). In this example, two ATMs connections between the terminals A1(10) and B1(12) and between the terminals A1(10) and A2(11) are registered in the ATM connection management table 71 in the ATM switch Sai 21. FIG. 12B shows the contents of the ATM connection management table 71 in the ATM switch Sbm 24 after the ATM connection has been established between the terminals A1(10) and B1(12). In this example, one ATM connection between the terminals A1(10) and B1(12) is registered in the ATM connection management table 71 in the ATM switch Sbm 24.

It is assumed that "100" is set to the input-side VPI 90, "100" to the input-side VCI 91, "101" to the output-side VPI 92, and "101" to the output-side VCI 93 for the ATM connection between the terminals A1(10) and B1(12). Further, in this case, as shown in FIG. 11A, the source terminal ATM address 102 "10" (ATM address of terminal A1(10)) in the set-up message 100-1 is registered in the address table 70-1 in the ATM switch Sai 21 shown in FIG. 4, while the destination terminal ATM address 101 "20" (ATM address of terminal B1(12) is not registered in this table. Accordingly, the CPU 61 in the ATM switch Sai 21 selects the BECN system as the congestion control system for the ATM connection in accordance with the operation flow of FIG. 6 and sets "1" (BECN mechanism) to the congestion system 95 in the ATM connection management table 71. Further, the FRP flag 94 is set to "0", the destination terminal ATM address 96 to "20" (ATM address of terminal B1(12)), the source terminal ATM address 97 to "10" (ATM address of terminal A1(10).

On the other hand, it is assumed that "200" is set to the input-side VPI 90, "200" to the input-side VCI 91, "201" to the output-side VPI 92, and "201" to the output-side VCI 93 for the ATM connection between the terminals A1(10) and B2(11). Further, in this case, as shown in FIG. 11B, the source terminal ATM address 102 "10" (ATM address of terminal A1(10)) in the set-up message 100 and the destination terminal ATM address 101 "11" (ATM address of terminal A2(11)) are registered in the address table 70-1 in the ATM switch Sai 21. Accordingly, the CPU 61 in the ATM switch Sai 21 selects the FECN mechanism as the congestion control system for the ATM connection in accordance with the operation flow of FIG. 6 and sets "3" (FECN mechanism) to the congestion system 95 in the ATM connection management table 71. Further, the FRP flag 94 is set to "0", the destination terminal ATM address 96 to "11" (ATM address of terminal A2(11)), the source terminal ATM address 97 to "10" (ATM address of terminal B1(12)).

Further, as shown in FIG. 12B, only the ATM connection between the terminals A1(10) and B1(12) is registered in the ATM connection management table 71 in the ATM switch Sbm 24.

It is assumed that "102" is set to the input-side VPI 90, "102" to the input-side VCI 91, "103" to the output-side VPI 92, and "103" to the output-side VCI 93 for the ATM connection between the terminals A1(10) and B1(12). Further, in this case, as shown in FIG. 11A, the source terminal ATM address 102 "10" (ATM address of terminal A1(10)) in the set-up message 100 is not registered in the address table 70-2 in the ATM switch Sbm 24 shown in FIG. 4B. Accordingly, the CPU 61 in the ATM switch Sbm 24 selects the FRP mechanism as the congestion control system for the ATM connection in accordance with the operation flow of FIG. 6 and sets "2" (FRP mechanism) to the congestion system 95 in the ATM connection management table 71. Further, the CPU 61 sets the FRP flag 94 to "0", the destination terminal ATM address 96 to "20" (ATM address of terminal B1(12)), and the source terminal ATM address 97 to "10" (ATM address of terminal A1(10)).

As described above, the ATM connections between the terminals A1(10) and B1(12) and between the terminals A1(10) and A2(11) are established.

[Operation of Data Transfer]

Actual operation of data transfer between the terminals A1(10) and B1(12) and between the terminals A1(10) and A2(11) now will be described.

Figure 13:
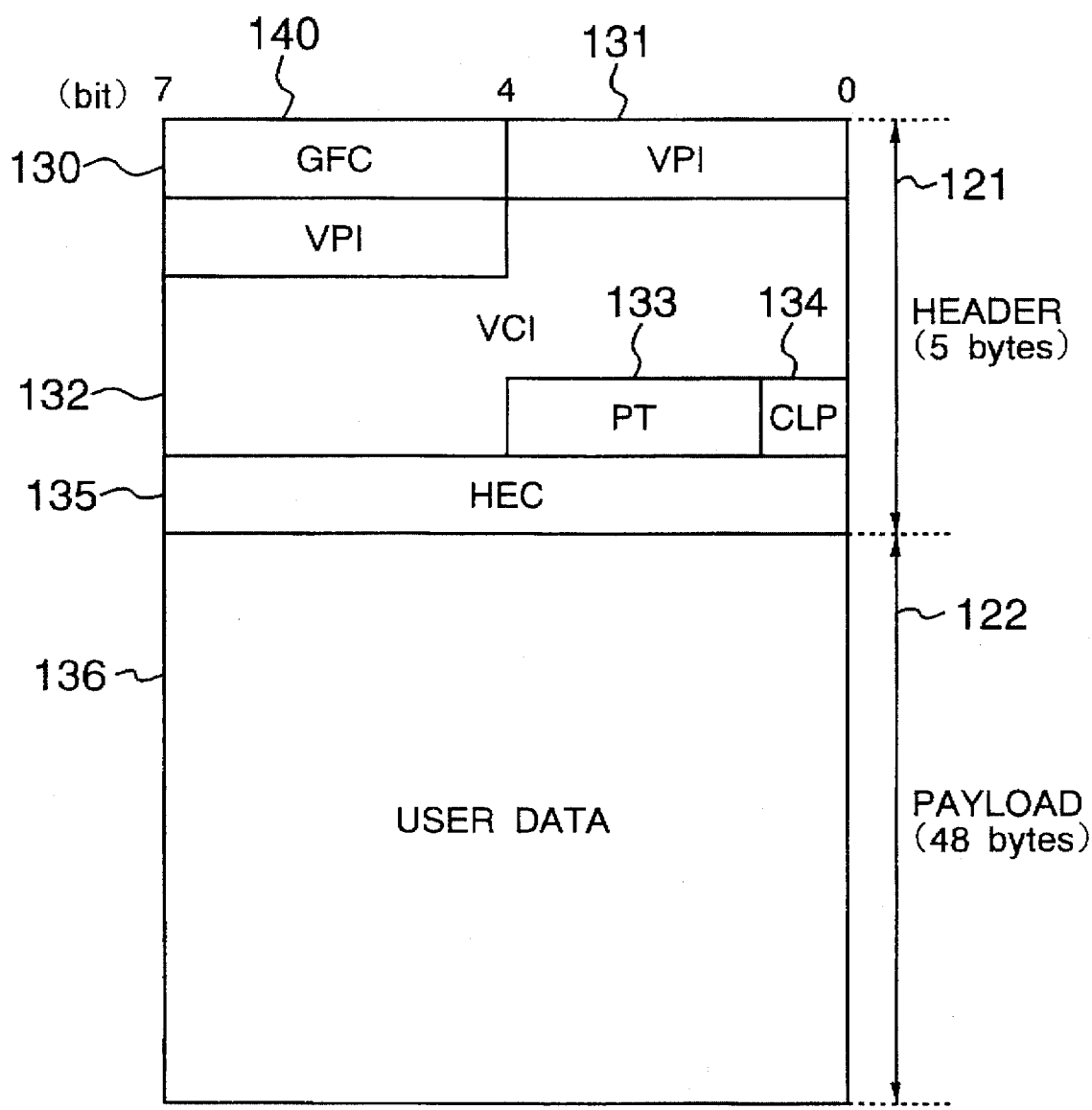
FIG. 13 shows a format of a cell for data transfer in the embodiment of the present intention.

FIG. 13 shows an example of a format of a cell 120 used for data transfer between the terminals A1(10) and B1(12) and between the terminals A1(10) and A2(11). The cell 120 includes a header 121 of 5 bytes and a payload 122 of 48 bytes. The header 121 includes a generic flow control (GFC) 130 of 4 bits, a VPI 131 of 8 bits, a VCI 132 of 16 bits, a PT 133 of 3 bits, a cell loss priority (CLP) of 1 bit indicative of a priority of cell loss and a header error control (HEC) 135 of 8 bits used for control of a header error.

The PT 133 is normally set to "000" in a binary indication of 3 bits. However, when the cell meets with congestion on the way, the PT is set to "010". Further, user data 136 are set in the payload 122 of the cell.

Figure 14:
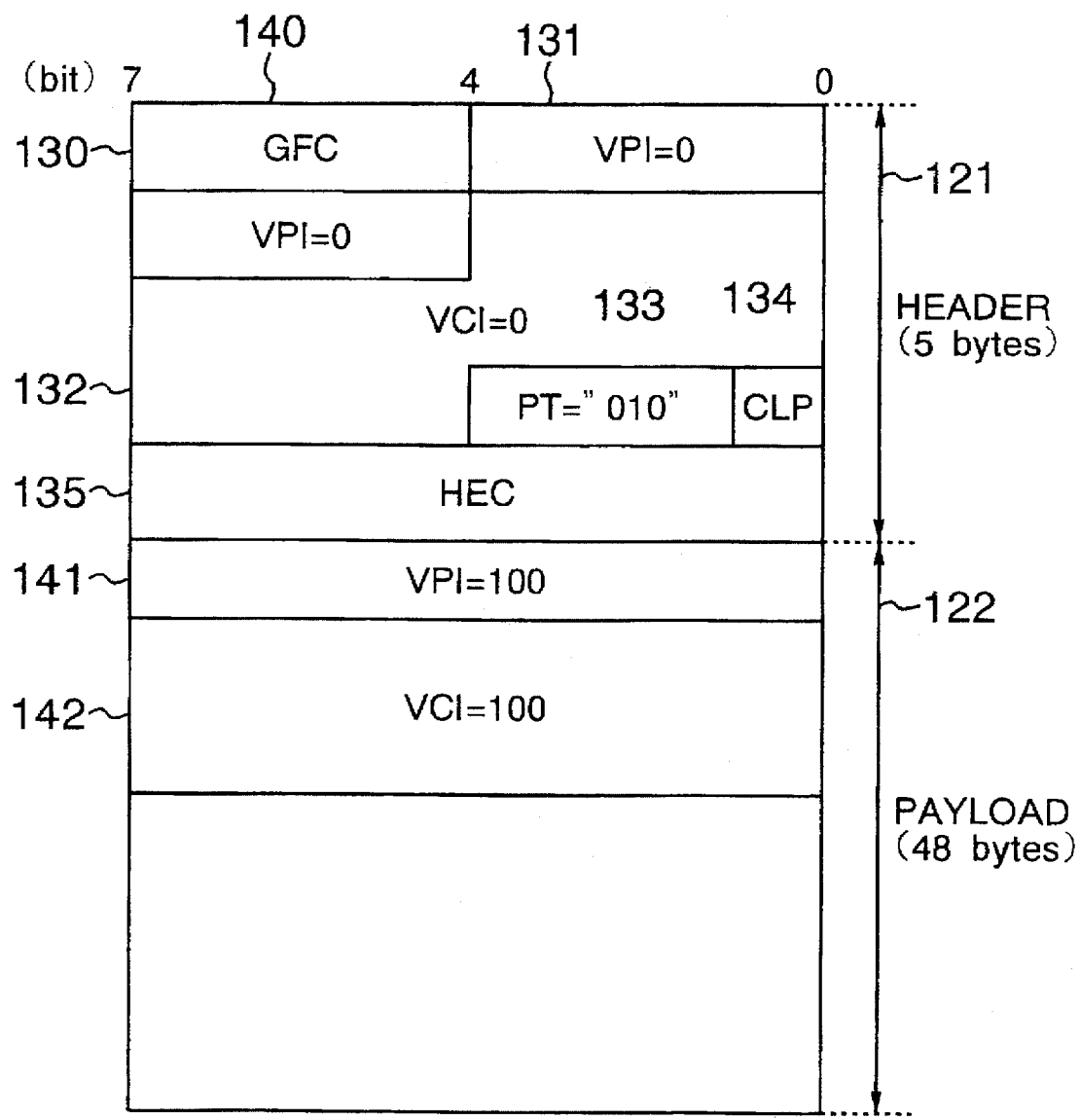
FIG. 14 shows a format of a CONTROL cell sent by the ATM switch Sai in the embodiment of the present invention.

FIG. 14 shows a format of a control cell 140 used for notification of congestion in the BECN mechanism and the FECN mechanism. In FIG. 14, a header 121 is the same format as that of FIG. 13, but the VPI 131 and the VCI 132 are set to values assigned for the CONTROL cell. In this embodiment, the VPI 131 and the VCI 132 are assigned with "0". Further, the user data 136 of the data transfer cell 120 is not set to the payload 122 and the VPI 141 and the VCI 142 determined between the ATM switches or between the ATM switch and the terminal are set to the payload 122 in order to identify the ATM connection. When each of the ATM switches receives the CONTROL cell, the ATM switch changes the VPI 141 and the VCI 142 (output-side VPI and VCI) to input-side VPI and VCI and transmits them again.

Figures 15A, 15B:
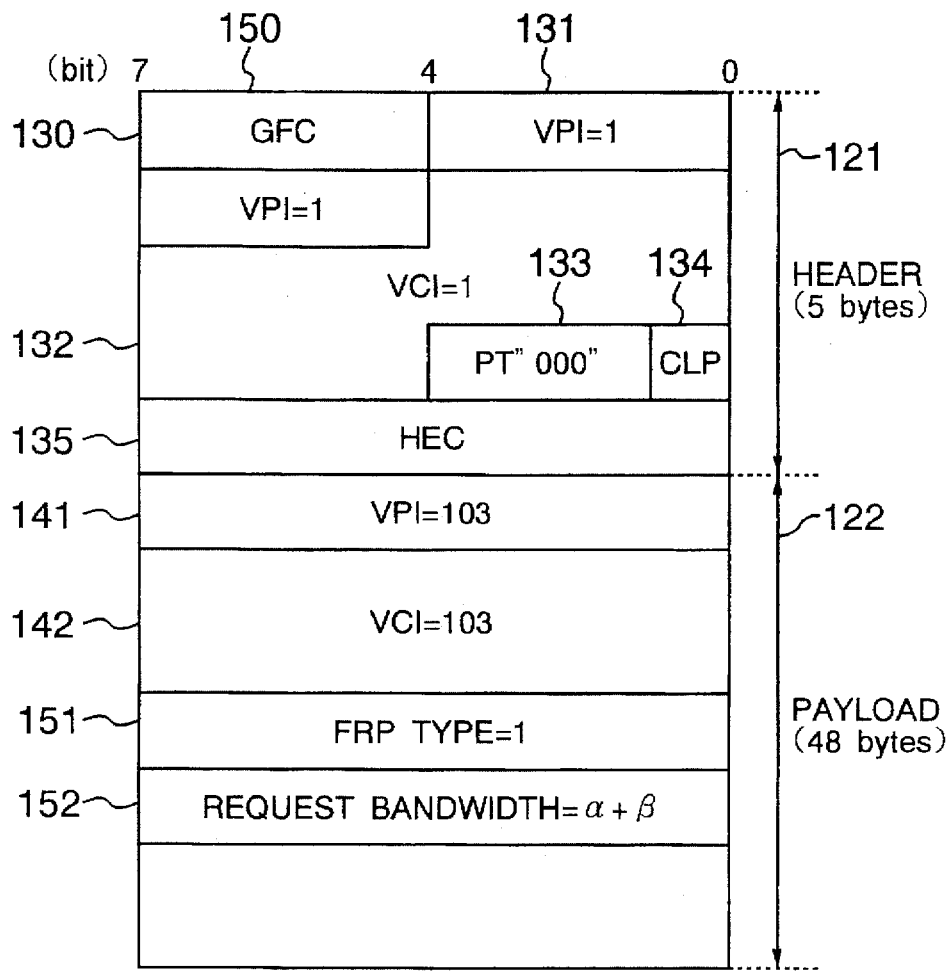
FIGS. 15A and 15B show formats of FRP cells in the embodiment of the present invention.

FIG. 15A shows a format of the FRP cell 150 used for control of the FRP system. FIG. 15A shows an example of the REQUEST cell to be described later. The header 121 of the FRP cell 150 has the same format as the normal data transfer cell 120, while the VPI 131 and the VCI 132 are set to values assigned for the FRP cell. In this example, the VPI 131 and the VCI 132 are assigned with "1". Further, the payload 122 is different from the normal data transfer cell 120 and CONTROL cell 140 and includes the VPI 141 and the VCI 142 for identifying the ATM connection, the FRP type 151 indicative of a kind of the FRP cell, and a request bandwidth 152 indicative of the bandwidth to be requested.

FIG. 15B shows a table indicative of a relation of the FRP type 151 and kinds of the FRP cell 150. The FRP cell 150 has four types of cells including a REQUEST cell (FRP type "1") for requesting increase of the bandwidth, a RECEIVED cell (FRP type "2") which is a response to the REQUEST cell, an ACCEPTED cell (FRP type "3") indicative of acceptance for the request of increasing the bandwidth, and a DENIED cell (FRP type "4") indicative of denial of the request for increasing the bandwidth.

Figure 16:
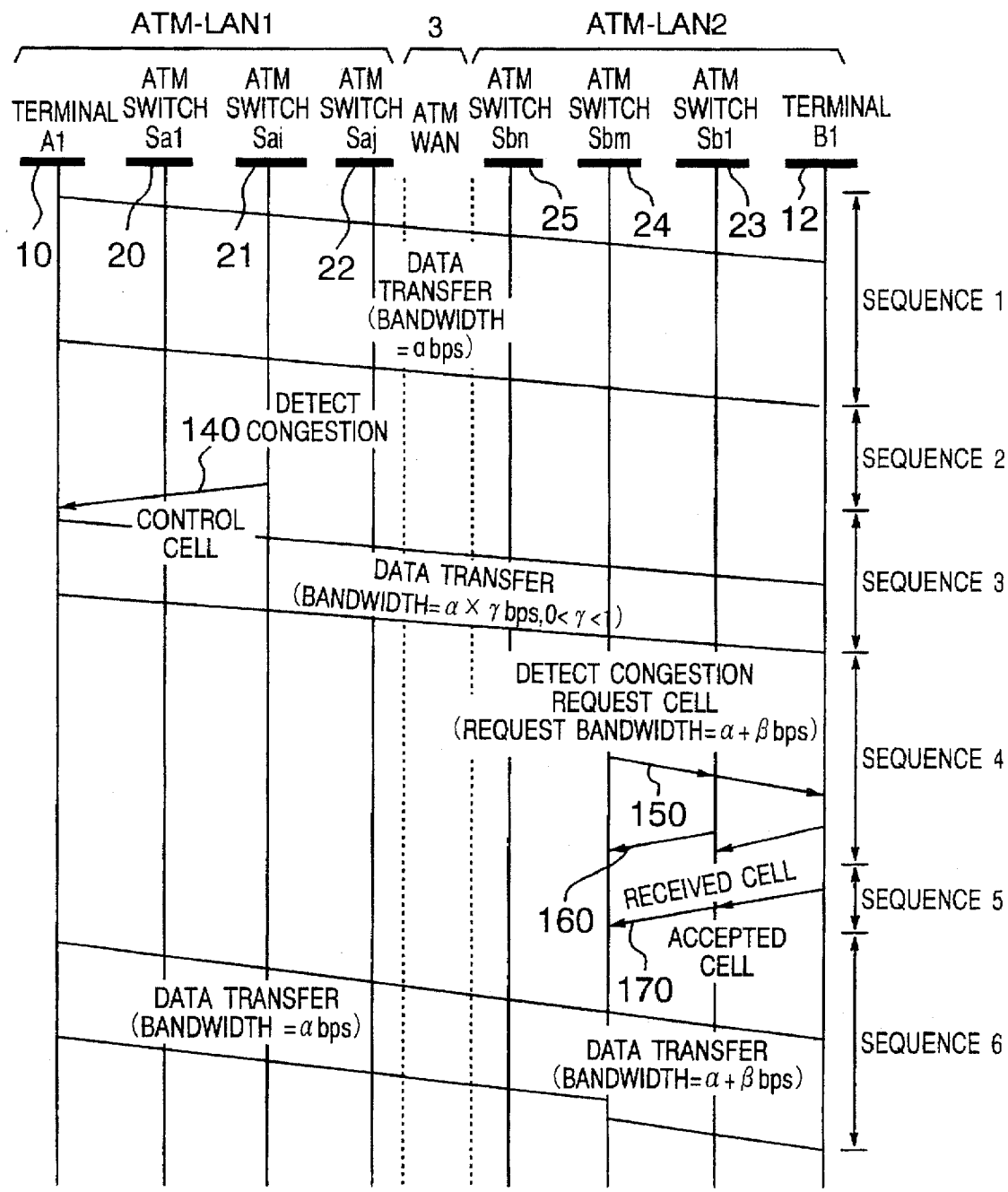
FIG. 16 is a diagram showing an operation sequence of the congestion control for the ATM connection between terminals A1 and B1 in the embodiment of the present invention.
Figure 22:
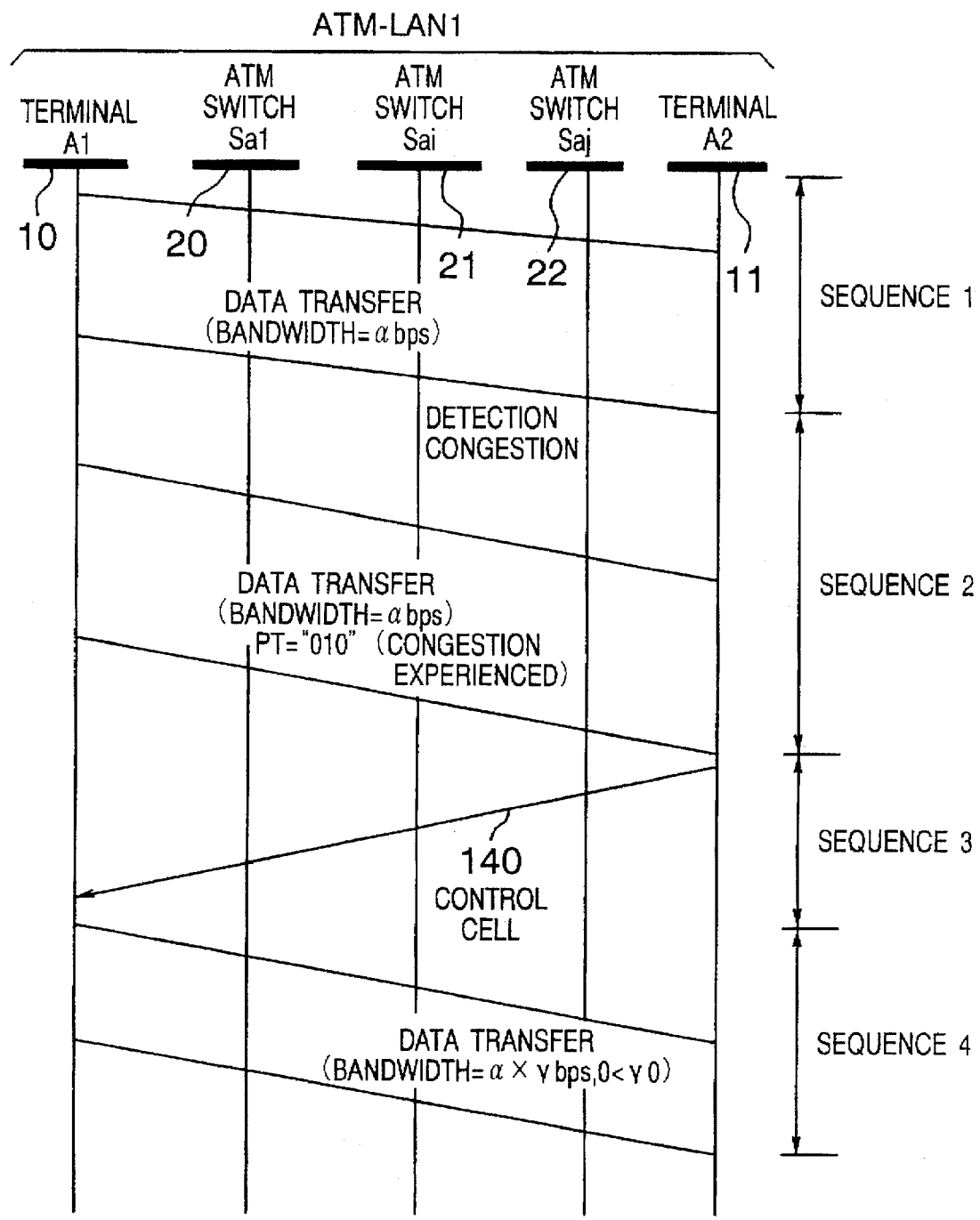
FIG. 22 is a diagram showing an operation sequence of the congestion control for the ATM connection between the terminals A1 and A2 in the embodiment of the present invention.

FIGS. 16 and 22 show operation sequences of the congestion control system according to the present invention which is applied to the network structure of FIG. 2. FIG. 16 shows an operation sequence in the case where an ATM connection is set up over two ATM-LANs and FIG. 22 shows an operation sequence in the case where an ATM connection is set up in the same ATM-LAN.

1. Normal Operation

Normal operation is first described. As shown in the sequence 1 of FIGS. 16 and 22, the source terminal A1(10) transfers data to the destination terminal B1(12) or A2(11) by the bandwidth {α (bps), for example, 10 (Mbps)} determined upon setting of the ATM connection by using the cell 120 shown in FIG. 13.

At this time, the CPU 61 in each ATM switch performs the congestion control program 73 shown in FIG. 7 and monitors whether congestion occurs or not. However, in the normal state where any congestion does not occur, the CPU 61 in each ATM switch does not detect congestion and accordingly the CPU finishes the congestion control program without any operation as shown in step S11 of FIG. 7.

At the same time, the CPU 61 in each ATM switch judges whether a REQUEST cell is received in step S50 or whether an ACCEPTED cell is received in step S56 or whether a DENIED cell is received in step S61 or a CONTROL cell 130 is received in step S65 as shown in FIG. 9 so that whether any cell is received or not is monitored. However, in this case, since each ATM switch does not receive any of these cells, the CPU 61 finishes the congestion control program without any operation.

Further, each terminal judges at each receiving of a cell whether a CONTROL cell 130 is received in step S70 or whether a REQUEST cell is received in step S72 or whether a cell having "010" set in the PT is received in step S77 of FIG. 10 so that whether any cell is received or not is monitored. However, in this case, since each terminal does not receive any of these cells, the RECEIVED cell control program is finished without any operation. In the normal state in which any congestion does not occur, communication is made as above.

2. Operation Upon Occurrence of Congestion in ATM-LAN Including Source Terminal

Description now will be made of the case where congestion occurs in the ATM-LAN including the source terminal.

Figure 17:
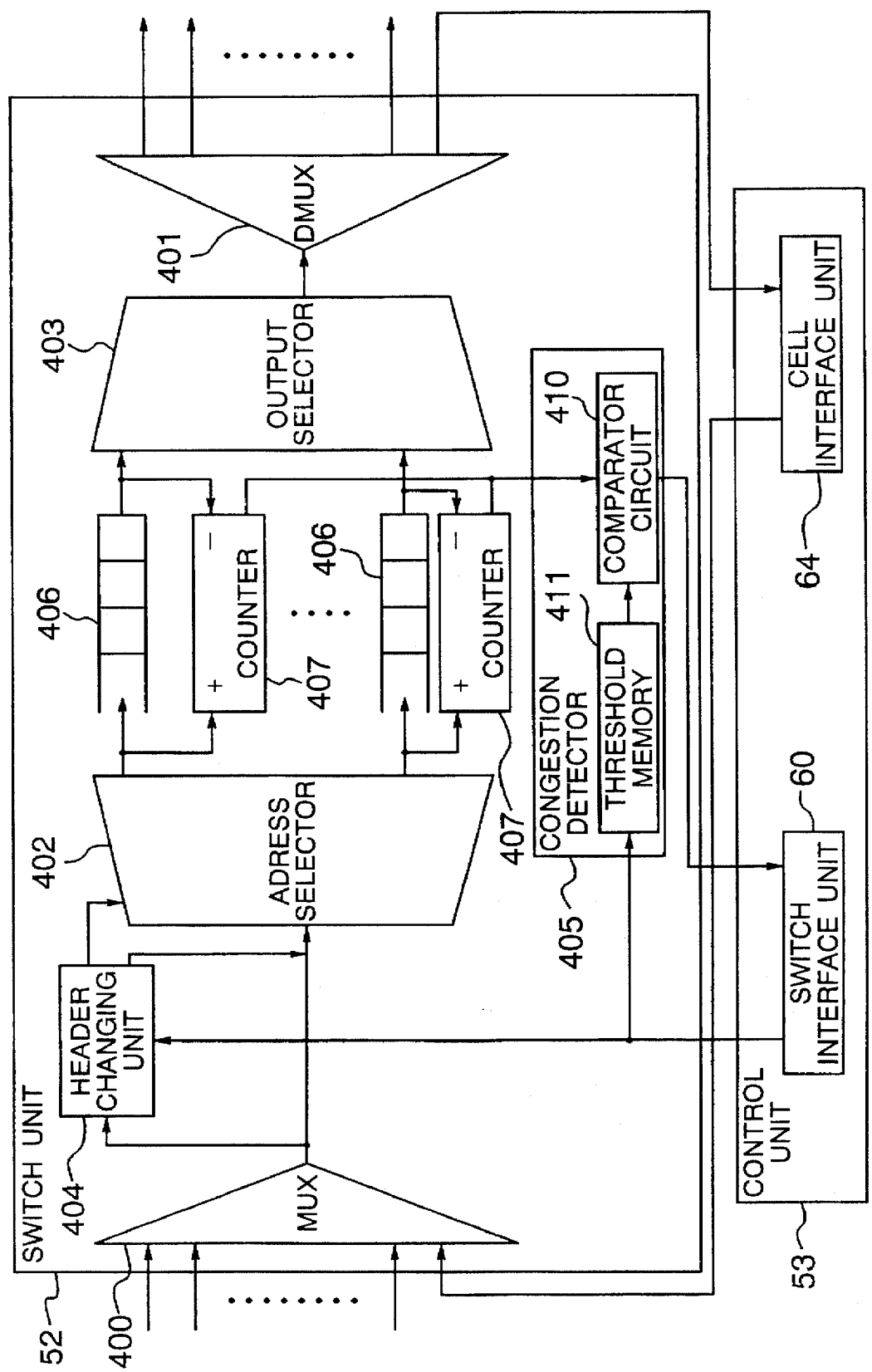
FIG. 17 schematically illustrates a switch unit in the embodiment of the present invention.

Referring now to FIG. 17 showing the configuration of the switch unit 52, a detection method of congestion is described. The switch unit 52 includes a multiplexer (MUX) 400, a demultiplexer (DMUX) 401, an address selector 402 for distributing cells to buffers for each VC, an output selector 403, a cell header changing unit 404 for rewriting the header of the received cell, a congestion detection unit 405 for detecting congestion, a plurality of buffers 406, and counters 407 indicating the number of cells buffered in the buffers 406. The counter 407 is incremented each time a cell is buffered in the buffer 406 and is decremented each time a cell is outputted from the buffer 406.

The congestion detection unit 405 includes a comparator circuit 410 and a threshold memory 411. A threshold for judging that the buffers 406 are congested is set in the threshold memory 411. The comparator circuit 410 always compares the threshold in the threshold memory 411 with a count of the counter 407 and judges that congestion occurs when the count of the counter 407 reaches or exceeds the threshold of the threshold memory 411. The judgment is communicated to the control unit 53. As described above, the ATM switch detects congestion.

Further, by setting the number of cells that the buffer 406 can buffer to the threshold memory 411, cell loss can be observed.

When it is assumed that traffic concentrates on the ATM switch Sai 21 in the ATM-LAN including the terminal A1(10) due to data transfer by another ATM connection and congestion occurs in the ATM switch Sai 21, the congestion is detected by the congestion detection unit 405 in the ATM switch Sai 21 and the CPU 61 detects occurrence of the congestion in step S11 of FIG. 7. The CPU 61 in the ATM switch Sai 21 performs congestion control for all ATM connections registered in the ATM connection management table 71 in its own switch in accordance with the flow of steps S12 to S17 of FIG. 7. At this time, the CPU 61 selects the congestion control system for the ATM connections on the basis of the congestion system 95 in the ATM connection management table 71.

In this case, the ATM connection management table 71 in the ATM switch Sai 21 is set to "1" as the congestion system 95 for the ATM connection between the terminals A1(10) and B1(12). Accordingly, the CPU 61 in the ATM switch Sai 21 performs the BECN mechanism for this ATM connection. Further, since "3" is set to the congestion system 95 for the ATM connection between the terminal A1(10) and A2(11), the CPU 61 in the ATM switch Sai 21 performs the FECN mechanism for this ATM connection.

First, the CPU 61 in the ATM switch Sai 21 starts the operation flow shown in FIG. 8A for the ATM connection between the terminals A1(10) and B1(12) and transmits the control cell 140 (sequence 2 of FIG. 16) in order to inform the source terminal A1(10) of occurrence of congestion in step S20 of FIG. 8A.

A specific example of the format of the control cell 140 is shown in FIG. 14. "0" is set to the VPI 131, "0" to the VCI 132, and "000" to the PT 133 in the header 121 of the control cell 140. "100" is set to the VPI 141 and "100" is set to the VCI 142 in the payload 122 thereof.

The CPU 61 in the ATM switch 200 (not shown) which has received the control cell 140 changes the output-side VPI 141 and VCI 142 set in the payload 122 of the control cell 140 on the basis of the ATM connection management table 71 in its own switch to the input-side VPI and VCI in accordance with the RECEIVED cell control program 74 shown in FIG. 9. The CPU 61 itself in the ATM switch 200 also transmits the control cell 140 changed as above to the upstream side.

Finally, the terminal A1(10) recognizes that the control cell 140 transmitted from the downstream ATM switch has been received in step S70 of FIG. 10. Thus, the terminal A1(10) reduces the bandwidth for the ATM connection corresponding to the VPI 141 and VCI 142 in the payload 122 of the control cell 140, that is, the ATM connection between the terminals A1(10) and B1(12) to {α×γ (bps), (0<γ<1)}.

Hereafter, the terminal A1(10) transfers data to the terminal B1(12) by using bandwidth {α×γ (bps), (0<γ<1)} (sequence 3 of FIG. 16). For example, when α is 10 (Mbps) and γ is 0.8, the bandwidth used hereafter becomes 8 (Mbps). Traffic on the ATM switch Sai 21 is suppressed by the above process.

3. Operation Upon Occurrence of Congestion in ATM-LAN in Which Source Terminal is Not Included The case where congestion occurs in an ATM-LAN different from that in which the source terminal is included now will be described with reference to FIG. 16. In the normal state, it is assumed that data transfer is made by the bandwidth α (bps) as shown in the sequence 1. However, it is assumed that traffic concentrates on the ATM switch Sbm 24 in the ATM-LAN 2 in which the source terminal A1(10) is included and congestion occurs. The CPU 61 in the ATM switch Sbm 24 detects congestion in step S11 of FIG. 7. Thus, the CPU 61 in the ATM switch Sbm 24 performs the congestion control for all ATM connections registered in the ATM connection management table 71 in its own switch in steps S12 to S14 of FIG. 7.

In this case, the ATM connection management table 71 in the ATM switch Sbm 24 is set to "2" as the congestion system 95 for the ATM connection between the terminals A1(10) and B1(12). Accordingly, the CPU 61 in the ATM switch Sbm 24 performs the FRP system for the ATM connection. That is, the CPU 61 in the ATM switch Sbm 24 starts the operation flow shown in FIG. 8B.

First, the CPU 61 in the ATM switch Sbm 24 transmits the REQUEST cell shown in FIG. 15A which is the FRP cell 150 of requesting increase of the bandwidth to the ATM switch adjacent to the downstream side of the ATM connection in order to increase the bandwidth to α+β (bps).

In the header 121 of the request cell 150, "1" is set to the VPI 131, "1" is set to the VCI 132, and "000" is set to the PT 133. Further, in the payload 122, "103" is set to the VPI 141, "103" is set to the VCI 142, "1" is set to the FRP type 151, and "α+β" is set to the request bandwidth 152.

The CPU 61 in the ATM switch Sbm 24 proceeds to step S31 in which "1", indicating that a request for increasing the bandwidth has been made to the ATM connection, is set to the FRP flag 94 of the corresponding ATM connection of the ATM connection management table 71 in its own switch shown in FIG. 12B and finishes the process. The ATM connection management table 71 at this time is shown in FIG. 18. As shown in FIG. 18, "1" is set to the FRP flag 94 in the ATM connection management table 71.

Figure 19:
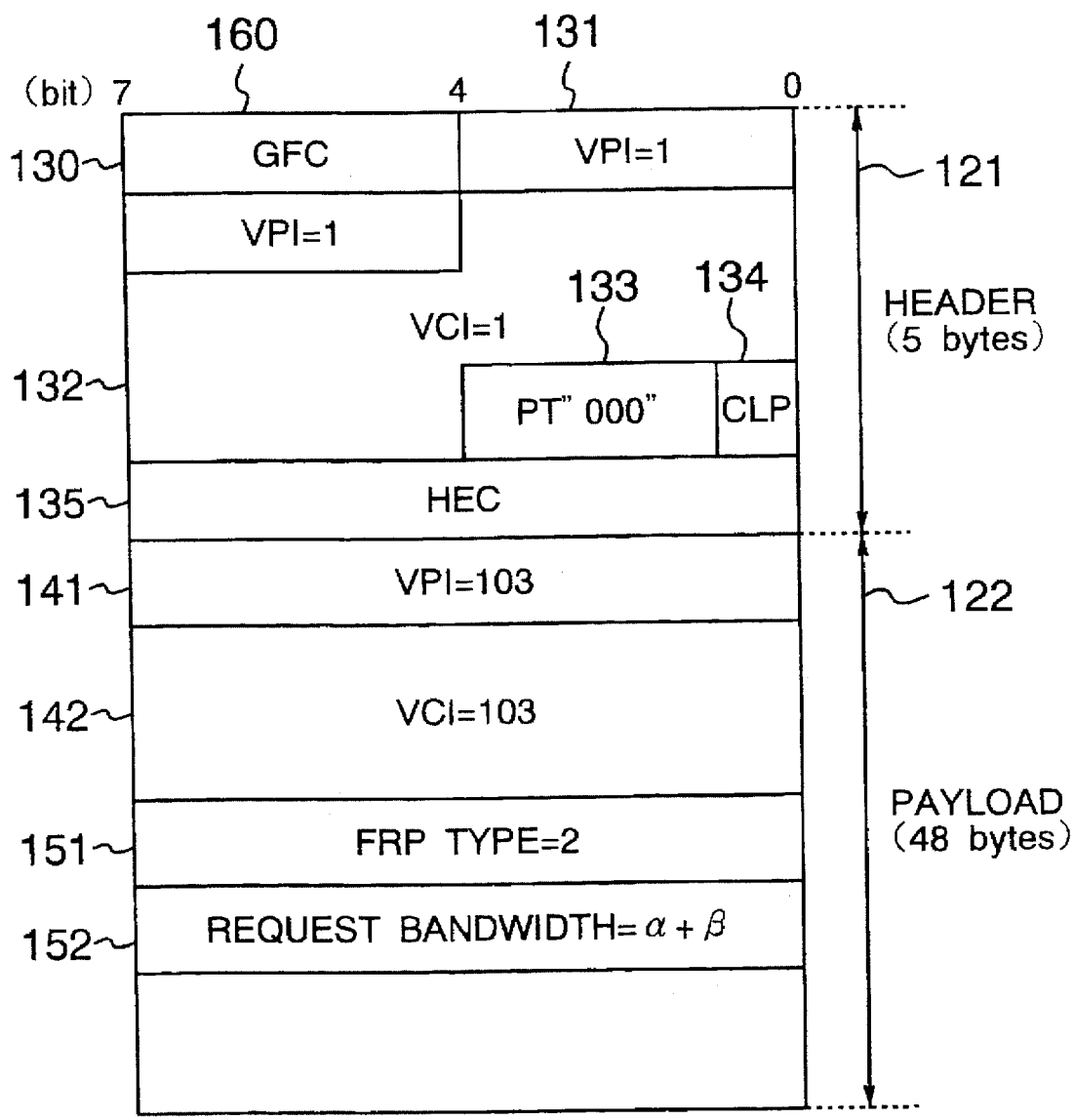
FIG. 19 shows an example of a format of an FRP RECEIVED cell in the embodiment of the present invention.

The REQUEST cell 150 transmitted from the ATM switch Sbm 24 is received by the ATM switch 201 (not shown) adjacent to the downstream side of the ATM connection. The CPU 61 in the ATM switch 201 confirms that the REQUEST cell 150 has been received in step S50 of FIG. 9. Thus, the process proceeds to step S51 and the RECEIVED cell 160 shown in FIG. 19 which is a response of the REQUEST cell 150 is transmitted to the ATM switch Sbm 24 adjacent to the upstream side. In the header 121 of the RECEIVED cell 160, "1" is set to the VPI 131, "1" is set to the VCI 132, and "000" is set to the PT 133. Further, in the payload 122, "103" is set to the VPI 141, "103" is set to the VCI 142, "2" is set to the FRP type 151 and "α+β" is set to the request bandwidth 152.

Then, the CPU 61 in the ATM switch 201 examines whether the request bandwidth, that is, {α+β (bps)} set to the request bandwidth 152 in the received request cell 150 can be accepted or not in step S52 of FIG. 9.

When it can be accepted, the CPU 61 itself in the ATM switch 201 also transmits the request cell 150 to the downstream side of the ATM connection in step S53. The process proceeds to step S54 in which the CPU 61 in the ATM switch 200 sets "1" indicative of the increase request of the bandwidth to the FRP flag 94 of the corresponding ATM connection in the ATM connection management table in its own switch and the process is finished.

The series of sequences (steps S50 to 54 of FIG. 9) are successively performed by each of the ATM switches until reaching the ATM switch Sbl 23. Consequently, "1" is set to the FRP flags 94 for the ATM connections between the terminals A1(10) and B1(12) in the ATM connection management tables 71 held in the ATM switches Sbm 24, . . . , Sbl 23. Finally, the request cell 150 is transmitted from the ATM switch Sbl 23 to the destination terminal B1(12).

The terminal B1(12) confirms that the request cell 150 has been received in step S72 of FIG. 10. The process proceeds to step S73 and the terminal B1(12) transmits the received cell 160 to the ATM switch Sbl 23 adjacent to the upstream side (sequence 4 of FIG. 16).

Figure 20:
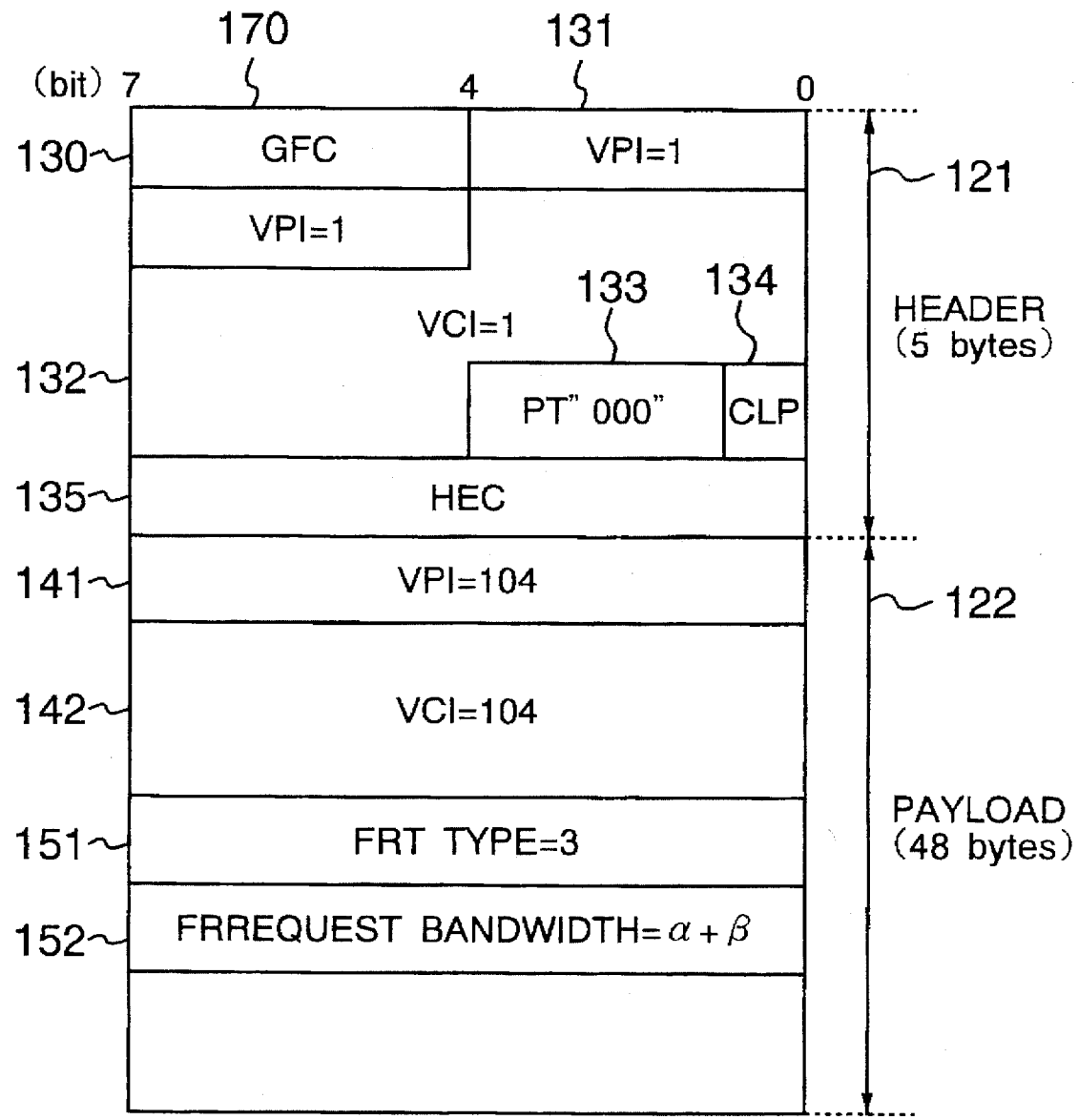
FIG. 20 shows an example of a format of an FRP ACCEPTED cell in the embodiment of the present invention.

Furthermore, the terminal B1(12) examines whether the request bandwidth {α+β (bps)} set in the request bandwidth 152 in the received request cell 150 can be accepted in step S74 of FIG. 10. When it can be accepted, the terminal B1(12) transmits the accepted cell 170 shown in FIG. 20 to the upstream ATM switch Sbl 23 in step S75 of FIG. 10 and the process is finished.

In the header 121 of the accepted cell 170, "1" is set to the VPI 131, "1" is set to the VCI 132, and "000" is set to the PT 133. Further, in the payload 122, "104" is set to the VPI 141, "104" is set to the VCI 142, "3" is set to the FRP type 151 and "α+β" is set to the request bandwidth 152. It is assumed that "104" are assigned to the VPI and VCI for the ATM connection between the ATM switch Sbl 23 and the terminal B1(12).

The CPU 61 in the ATM switch Sbl 23 confirms that the accepted cell 170 has been received in step S56 of FIG. 9. The process proceeds to step S57 in which the CPU 61 in the ATM switch Sbl 23 examines whether the FRP flag 94 of the corresponding ATM connection in the ATM connection management table 71 in its own switch is set to "1" or not. As described above, since the FRP flag 94 for the ATM connection between terminals A1(10) and B1(12) in the ATM connection management table 71 of the ATM switch Sbl 23 is already set to "1", the process proceeds to step S57 of FIG. 9. At this time, when "1" is not set to the FRP flag 94, the accepted cell 170 is regarded as being invalid and the process is finished.

The CPU 61 in the ATM switch Sbl 23 sets the FRP flag 94 in the ATM connection management table 71 to "0" in step S57 of FIG. 9. Further, the process proceeds to step S22 in which the CPU 61 in the ATM switch Sbl 23 transmits the accepted cell 170 to the ATM switch 202 (not shown) adjacent to the upstream side of the ATM connection. The CPU 61 in the ATM switch Sbl 23 hereafter increases the bandwidth on the downstream side of the ATM connection to {α+β (bps)} in step S60 and relays it.

The series of sequences (steps S56 to S60 of FIG. 9) are successively performed until reaching the ATM switch Sbm 24. Finally, the ATM switch Sbm 24 receives the accepted cell 170 and the bandwidth of the ATM connection is increased to {α+β (bps)} (sequence 5 of FIG. 16). Thus, the request for increase of the bandwidth is successful.

The terminal A1(10) hereafter performs data transfer using the bandwidth {α (bps)} as it is, while data transfer is performed using the bandwidth {α+β (bps)} from the ATM switch Sbm 24 to the terminal B1(12) (sequence 6 of FIG. 16). Consequently, the bandwidth from the ATM switch Sbm 24 is increased and accordingly congestion is eliminated.

Figure 21:
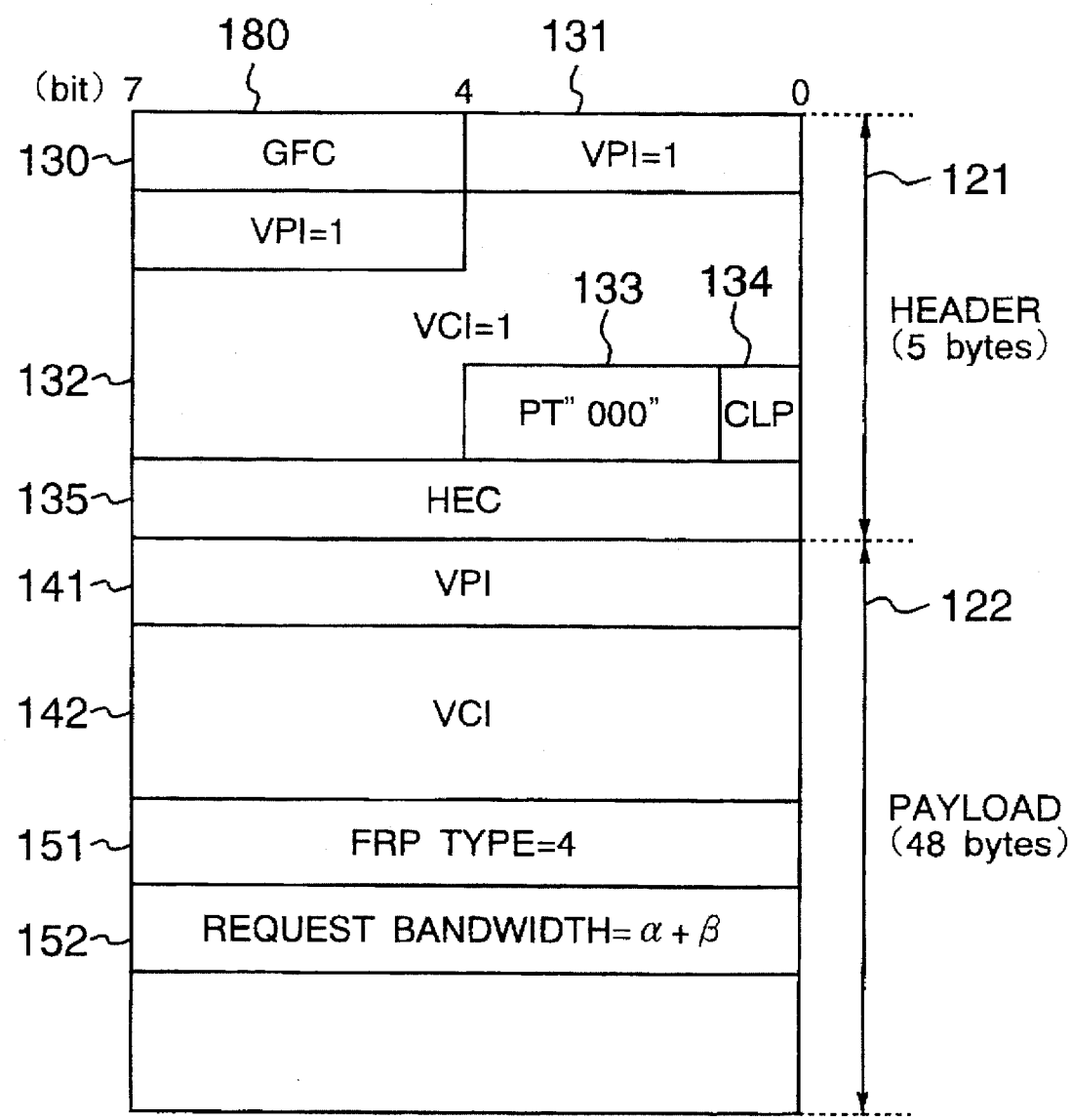
FIG. 21 shows an example of a format of an FRP DENIED cell in the embodiment of the present invention.

In step S52 of FIG. 9, when the CPU in each ATM switch cannot accept the requested bandwidth 152 {α+β (bps)}, the CPU transmits the denied cell 180 shown in FIG. 21 to the ATM switch adjacent to the upstream side of the ATM connection and the process is finished.

As shown in FIG. 21, in the header 121 of the denied cell 180, "1" is set to the VPI 131, "1" is set to the VCI 132, and "000" is set to the PT 133. Further, in the payload 122, "4" is set to the FRP type 151 and "α+β" is set to the request bandwidth 152. Further, values assigned upon setting of the ATM connection in each ATM switch are set to the VPI 141 and the VCI 142 in the payload 122.

When the CPU 61 in each ATM switch confirms that the denied cell 180 has been received in step S61 of FIG. 9, the process proceeds to step S62 in which the CPU 61 examines whether the FRP flag 94 of the corresponding ATM connection in the ATM connection management table 71 in its own switch is set to "1" or not. Since the FRP flag 94 for the ATM connection between the terminals A1(10) and B1(12) in the ATM connection management table 71 of each ATM switch is set to "1" as described above, the process proceeds to step S63 of FIG. 9. When "1" is not set to the FRP flag 94, the denied cell 180 is regarded as being invalid and the process is finished.

The CPU 61 in each ATM switch sets the FRP flag 94 in the ATM connection management table 71 to "0" in step S63 of FIG. 9.

Further, the process proceeds to step S64 in which the denied cell 180 is transmitted to the upstream ATM switch of the ATM connection, and the process is finished. The series of sequences (steps S61 to S64 of FIG. 9) are performed until reaching the ATM switch Sbm 24. Consequently, since the increase request of the bandwidth is unsuccessful and the bandwidth is not quite increased, the congestion is not recovered.

Further, in step S74 of FIG. 10, when the terminal B1(12) rejects the increase of the bandwidth, the denied cell 180 is transmitted similarly. Consequently, the request for increase of the bandwidth is unsuccessful and the bandwidth is not quite increased. Accordingly, the congestion is not eliminated. However, since the distance from the ATM switch Sbm 24 to the destination terminal B1(12) is short, the probability that the request for increase of the bandwidth will be successful is high.

4. Operation Upon Occurrence of Congestion in ATM-LAN including Source Terminal A1(10) and Destination Terminal A2(11) Together When the source terminal A1(10) and the destination terminal A2(11) belong to the same ATM-LAN, the operation upon occurrence of congestion in the ATM-LAN will be as now described with reference to FIG. 22.

In the ATM-LAN, data transfer is normally made using the bandwidth {α (bps)} as shown in the sequence 1 of FIG. 22. At this time, traffic concentrates on the ATM switch Sai 21 and congestion occurs.

The CPU 61 in the ATM switch Sai 21 detects congestion in step S11 of FIG. 7 and performs congestion control for all ATM connections registered in the ATM connection management table in its own switch. That is, the CPU 61 judges whether the congestion system 95 is "1" or not with reference to the congestion system 95 in the ATM connection management table 71 in its own switch (step S12) and then judges whether the congestion system 95 is "2" or not (step S15). For example, the ATM connection including the source terminal A1(10) having an address of "10" and the destination terminal A2(11) having an address of "11" has the congestion system 95 which is "3" and accordingly the congestion process of the FECN system is performed to this ATM connection.

That is, the CPU 61 in the ATM switch Sai 21 starts the operation flow shown in FIG. 8C. The CPU 61 in the ATM switch Sai 21 sets the PT 133 of the cell header 121 in the data transfer cell 190 of the FECN system shown in FIG. 23 to "010" (congested) in step S40 and transmits the cell to the ATM switch adjacent to downstream side of the ATM connection.

Figure 23:
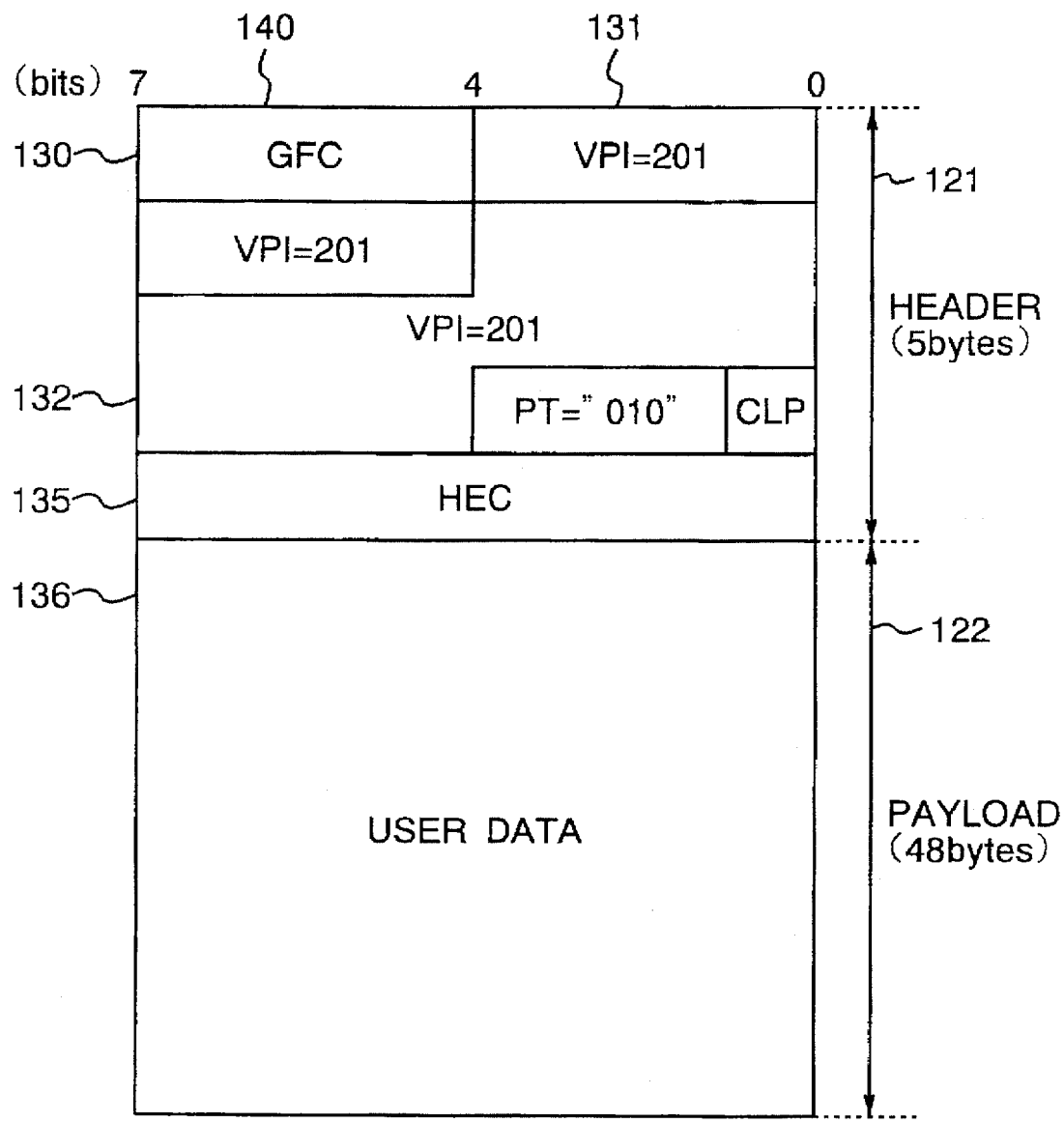
FIG. 23 shows an example of a format of a cell having "010" set in PT sent by the ATM switch Sai in the embodiment of the present invention.
Figure 24:
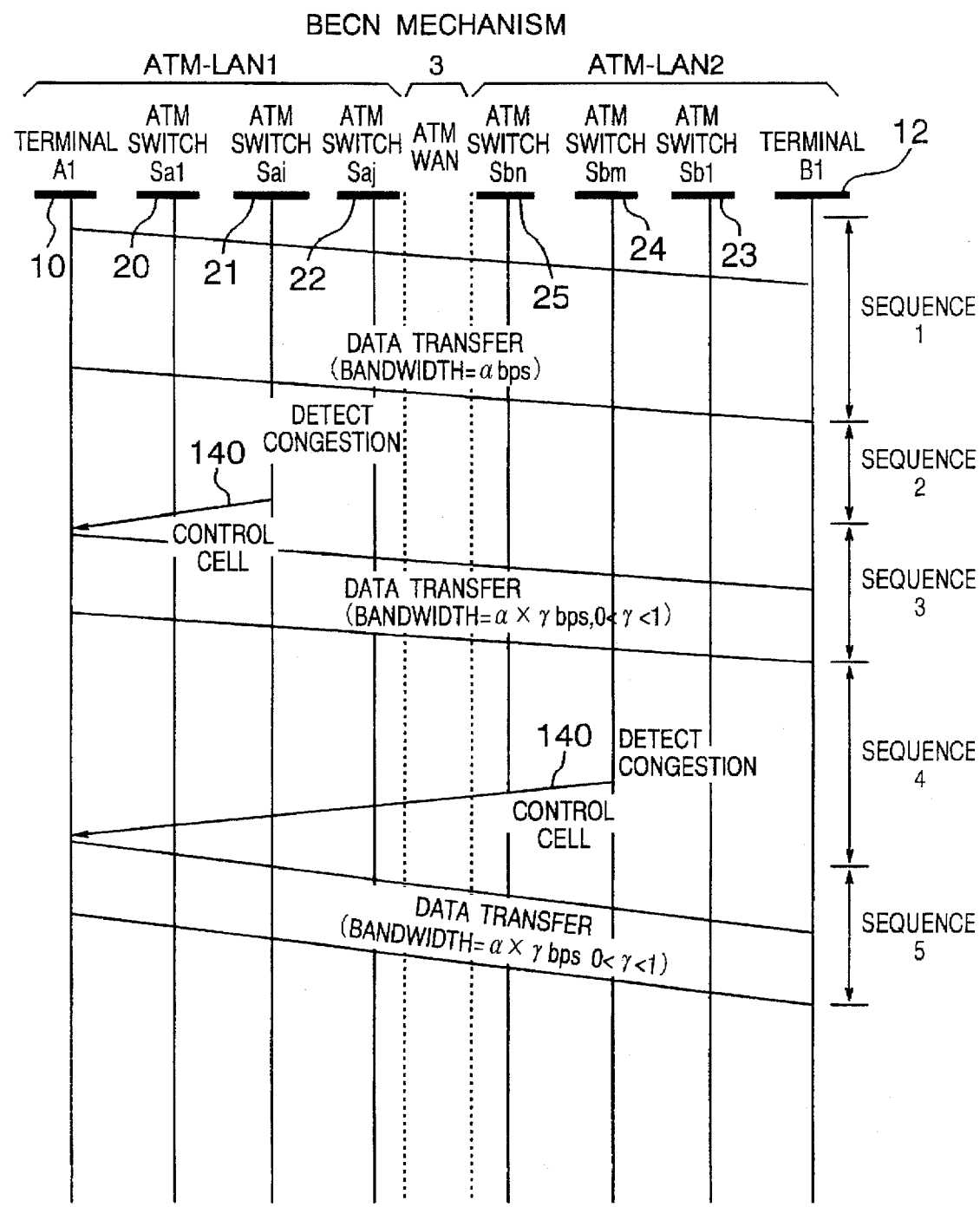
FIG. 24 is a diagram showing an operation sequence in the case where the BECN mechanism is used to control congestion in the network structure of FIG. 2.
Figure 25:
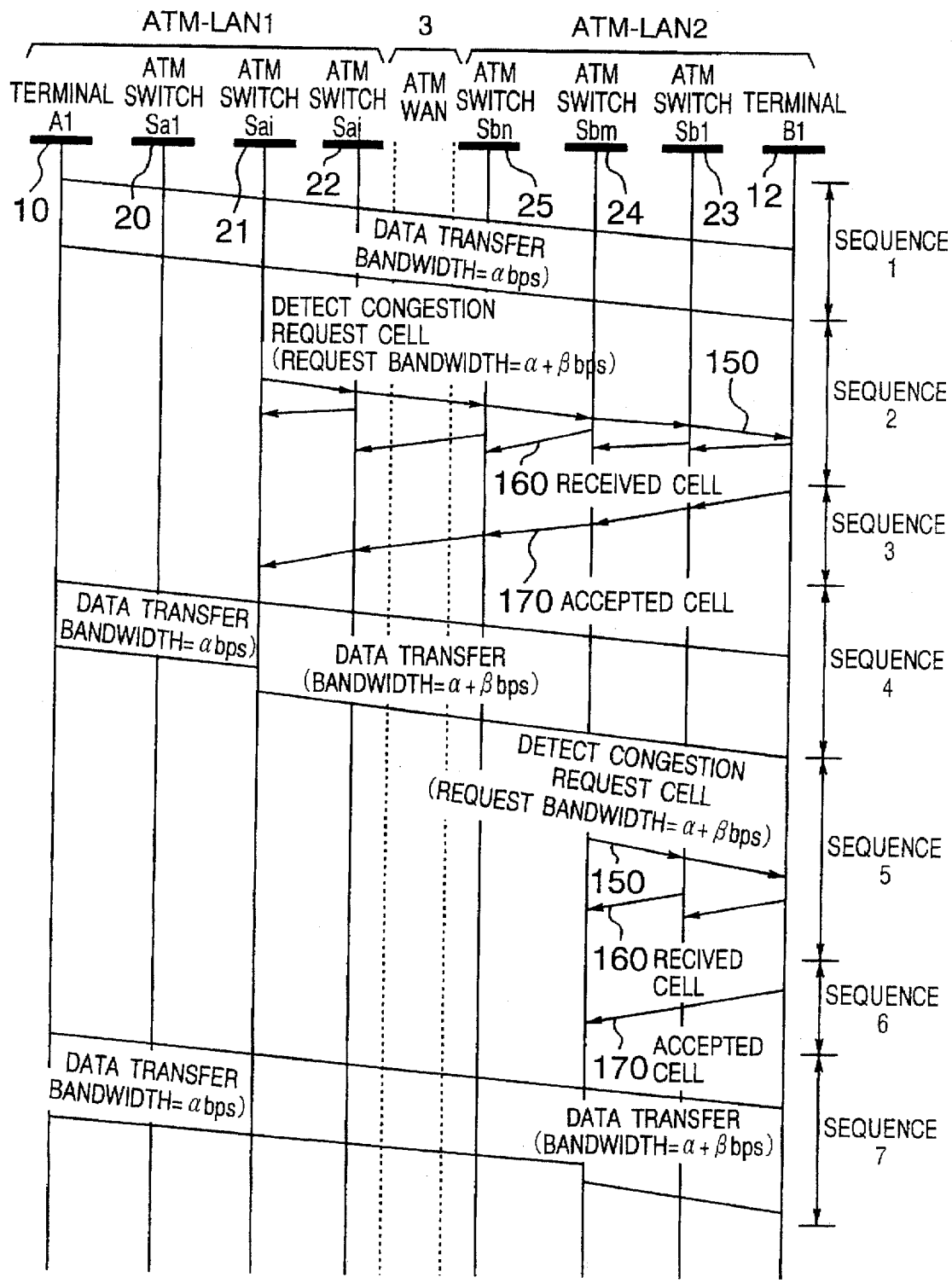
FIG. 25 is a diagram showing an operation sequence in the case where the FRP mechanism is used to control congestion in the network structure of FIG. 2.
Figure 26:
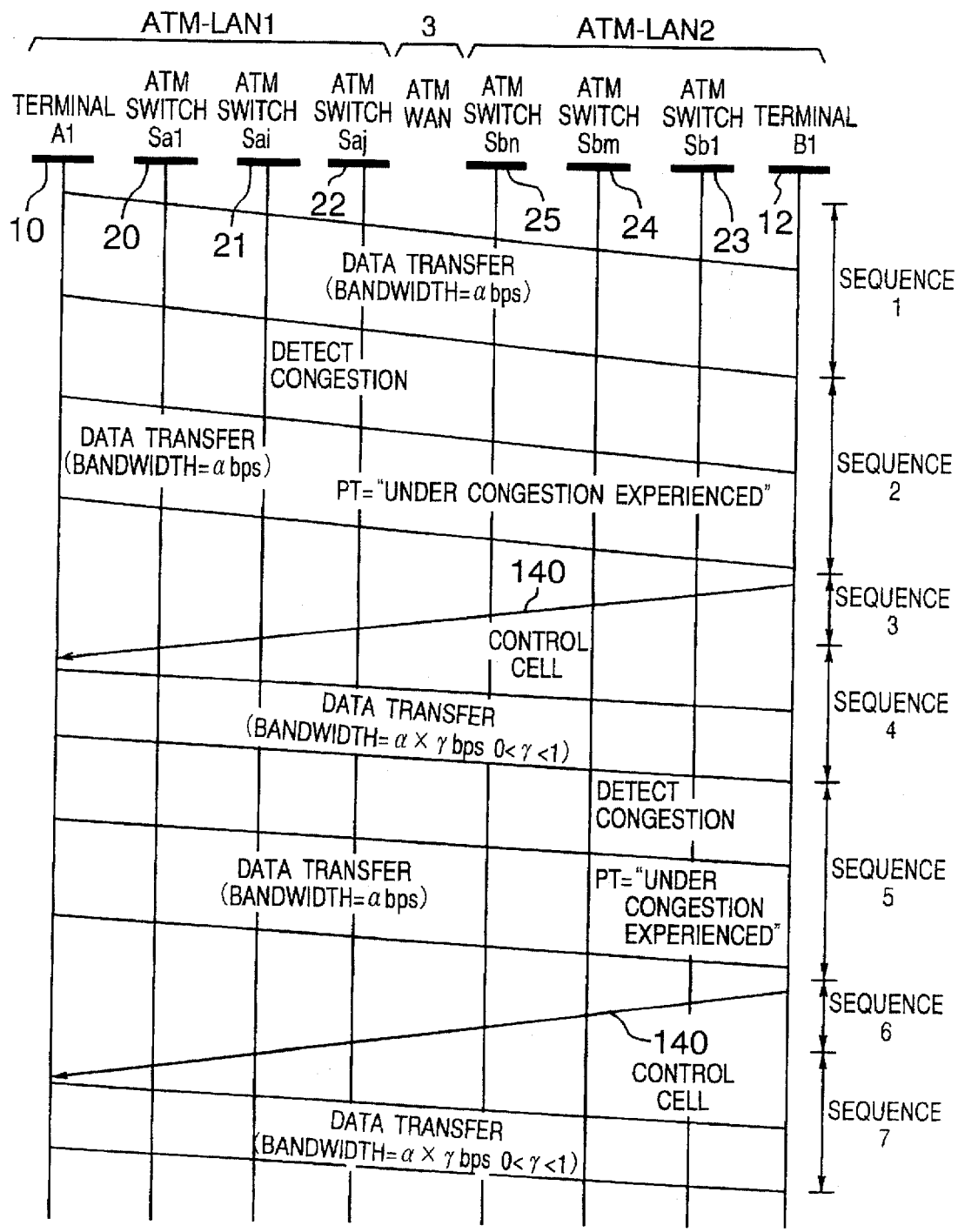
FIG. 26 is a diagram showing an operation sequence in the case where the FECN mechanism is used to control congestion in the network structure of FIG. 2.

Each of the downstream ATM switches transfers the cell to the downstream side successively (sequence 2 of FIG. 22). As shown in FIG. 23, in the header 121 of the data transfer cell 190, "201" is set to the VPI 131 and "201" is set to the VCI 132.

The CPU of the destination A2(11) which has received the cell from the ATM switch Saj 22 judges whether the PT 133 of the cell 190 received in step S77 of FIG. 10 is "010" (congestion experienced) or not. When the CPU detects that it is congested, the CONTROL cell 140 shown in FIG. 14 is transmitted to the upstream side (step S73). At this time, in the header 121 of the CONTROL cell 140, "200" is set to the VPI 131, "200" is set to the VCI 132, and "010" is set to the PT 133. Further, in the payload 122 of the CONTROL cell 140, "201" is set to the VPI 141, "201" is set to the VCI 142. The CONTROL cell 140 is successively transferred to the upstream side and is finally transferred to the transmitting side terminal A1(10) (sequence 3 of FIG. 22).

Finally, the terminal A1(10) recognizes that the CONTROL cell 140 sent from the downstream ATM switch has been received in step S70 of FIG. 10. Thus, the terminal A1(10) reduces the bandwidth for the ATM connection corresponding to the VPI 141 and the VCI 142 in the payload 122 of the CONTROL cell 140, that is, the bandwidth of the ATM connection between the terminals A1(10) and B1(12) to $\{\alpha \times j$ (bps), $(0<\gamma<1)\}$ in step S71 of FIG. 10.

Hereafter, the terminal A1(10) performs data transfer to the terminal B1(12) using the bandwidth $\{\alpha \times \gamma$ (bps), $(0<\gamma<1)\}$ (sequence 4 of FIG. 22). For example, when $\alpha=10$ (Mbps) and $\gamma=0.8$, the subsequent bandwidth is 8 (Mbps). Traffic to the ATM switch Sai 21 is suppressed by this process.

In the above embodiment, three congestion control systems, including the BECN mechanism, the FRP mechanism and the FECN mechanism are used, although congestion also may be controlled using only two systems, such as the BECN mechanism and the FRP mechanism.

In the latter case, when the source terminal and the destination terminal belong to the same ATM-LAN and congestion occurs in the ATM switch of the ATM-LAN, the congestion is controlled by the BECN mechanism instead of the FECN mechanism. More particularly, when congestion occurs in the ATM switch Sai 21 of the ATM-LAN 1, congestion control is performed by the BECN mechanism for the ATM connection between the terminals A1(10) and A2(11) instead of the FECN mechanism.

To this end, the operation flow of the ATM connection setting process shown in FIG. 6 may be changed so that "1" (BECN mechanism) is set to the congestion system 95 of the ATM connection management table 71 when the ATM address of the source terminal is registered in the address table 70 in the ATM switch and "2" (FRP system) is set thereto when not registered.

Further, on the contrary, the operation flow of the ATM connection setting process may be changed so that "2" (FRP mechanism) is set to the congestion system 95 of the ATM connection management table 71 when the destination terminal ATM address is registered in the address table 70 in the ATM switch and "1" (BECN mechanism) is set thereto when it is not registered. Thus, when the destination terminal belongs to the same ATM-LAN as the ATM switch in which congestion occurs, the congestion is controlled by the FRP mechanism.

In the embodiment, when congestion occurs in the ATM switch Sai 21 of the ATM-LAN 1, the congestion is controlled by the FRP mechanism instead of the FECN mechanism for the ATM connection between the terminals A1(10) and A2(11).

As described above, according to the present invention, when the source terminal and the destination terminal belong to different ATM-LAN, that is, when the distance between the source terminal and the destination terminal is long and congestion occurs in the ATM-LAN including the source terminal, that is, when congestion occurs in a relatively near place to the source terminal, the congestion is controlled by the BECN mechanism, so that the delay time required until the occurrence of congestion is communicated to the source terminal can be made short and cell loss prior to bandwidth reduction after occurrence of congestion can be reduced.

Further, when congestion occurs in a ATM-LAN different from the ATM-LAN including the source terminal, that is, when congestion occurs in a relatively distant place from the source terminal, the congestion is controlled by the FRP mechanism. Thus, the probability that the request for increase of the bandwidth will be successful is high and the probability that congestion will be eliminated is high.

Furthermore, the nearer the distance between the destination terminal and the ATM switch in which congestion occurs, the higher the probability, and the delay time required until the congestion is eliminated can be made small to reduce cell loss until the congestion is eliminated.

On the other hand, when the source terminal and the destination terminal are included in the same ATM-LAN, that is, when a distance between the source terminal and the destination terminal is short, congestion control is made by the FECN mechanism. Accordingly, the delay time required until occurrence of congestion is communicated to the source terminal can be made small and cell loss prior to bandwidth reduction after the occurrence of congestion can be reduced. Furthermore, since the FECN mechanism is the congestion control system having a light load, the overhead of the process required for the congestion control can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A congestion control method in an ATM network system in which a plurality of ATM-LANs are connected through an ATM-WAN and each of said ATM-LANs includes one or more ATM switches and terminals connected to each of said ATM switches, comprising:

a first judgment step of judging, in response to a request for setting an ATM connection through at least one ATM switch between a source terminal and a destination terminal, whether an ATM-LAN to which the source terminal is connected and an ATM-LAN to which the destination terminal is connected are different from each other or not and whether the ATM-LAN to which the source terminal is connected and the ATM-LAN including said at least one ATM switch are different from each other or not;

a first memory step of storing in said one ATM switch information indicating that a fast reservation protocol mechanism is selected as a congestion control system in response to the fact that a judgment result of said first judgment step is affirmative;

a second judgment step of judging whether the ATM-LAN to which the source terminal is connected and the ATM-LAN to which the destination terminal is connected are different from each other or not and whether the ATM-LAN to which the source terminal is connected and the ATM-LAN including said at least one ATM switch are identical with each other or not in response to the fact that the judgment result of said first judgment step is negative;

a second memory step of storing in said at least one ATM switch information indicating that a backward explicit congestion notification mechanism is selected as the congestion control system in response to the fact that the judgment result of said second judgment step is affirmative;

a third memory step of storing in said at least one ATM switch information indicating that a forward explicit congestion notification mechanism is selected as the congestion control system in response to the fact that the ATM-LAN to which the source terminal is connected and the ATM-LAN to which the destination terminal is connected are identical; and an execution step of executing control of congestion according to the stored information indicating a selected congestion control system in response to occurrence of congestion relative to said ATM connection in said at least one ATM switch.

2. In an ATM network system in which a plurality of ATM-LANs are connected through an ATM-WAN and each of said ATM-LANs includes one or more ATM switches and terminals connected to each of said ATM switches, at least one ATM switch comprising:

first judgment means for judging whether an ATM-LAN to which a source terminal is connected and an ATM-LAN to which a destination terminal is connected are different from each other or not and whether the ATM-LAN to which the source terminal is connected and an ATM-LAN to which said at least one ATM switch belongs are different from each other or not in response to a request for setting an ATM connection between the source terminal and the destination terminal:

first memory means for storing information indicating that a fast reservation protocol mechanism is selected as a congestion control system in response to the fact that a judgment result of said first judgment means is affirmative;

second judgment means for judging whether the ATM-LAN to which the source terminal is connected and the ATM-LAN to which the destination terminal is connected are different from each other or not and whether the ATM LAN to which the source terminal is connected and the ATM-LAN to which said at least one ATM switch belongs are identical with each other or not in response to a negative judgment result of said first judgment means;

second memory means for storing information indicating that a backward explicit congestion notification mechanism is selected as a congestion control system in response to the fact that the judgment result of said second judgment means is affirmative;

third memory means for storing information indicating that a forward explicit congestion notification mechanism is selected as a congestion control system in response to the fact that the ATM-LAN to which the source terminal is connected and the ATM-LAN to which the destination terminal is connected are identical with each other; and execution means for executing control of congestion according to the stored information indicating a selected congestion control system in response to occurrence of congestion relative to said ATM connection in said at least one ATM switch.

3. A congestion control method in an ATM network system in which a plurality of ATM-LANs are connected through an ATM-WAN and each of said ATM-LANs includes one or more ATM switches and terminals connected to each of said ATM switches, comprising:

a first judgment step of judging, in response to a request for setting an ATM connection through at least one ATM switch between a source terminal and a destination terminal, whether the ATM-LAN to which the source terminal is connected and the ATM-LAN including said at least one ATM switch are different from each other or not;

a first memory step of storing in said at least one ATM switch information indicating that a fast reservation protocol mechanism is selected as a congestion control system in response to the fact that a judgment result of said first judgment step is affirmative;

a second memory step of storing in said at least one ATM switch information indicating that a backward explicit congestion notification mechanism is selected as the congestion control system in response to the fact that the judgment result of said first judgment step is negative; and an execution step of executing control of congestion according to the stored information indicating a selected congestion control system in response to occurrence of congestion relative to said ATM connection in said at least one ATM switch.

4. In an ATM network system in which a plurality of ATM-LANs are connected through an ATM-WAN and each of said ATM-LANs includes one or more ATM switches and terminals connected to each of said ATM switches, at least one ATM switch comprising:

first judgment means for judging whether an ATM-LAN to which a source terminal is connected and an ATM-LAN to which said at least one ATM switch belongs are different from each other or not in response to a request for setting an ATM connection between the source terminal and the destination terminal;

first memory means for storing information indicating that a fast reservation protocol mechanism is selected as a congestion control system in response to the fact that a judgment result of said first judgment means is affirmative;

second memory means for storing information indicating that a backward explicit congestion notification mechanism is selected as a congestion control system in response to the fact that the judgment result of said first judgment means is negative; and execution means for executing control of congestion according to the stored information indicating a selected congestion control system in response to occurrence of congestion relative to said ATM connection in said at least one ATM switch.

5. A congestion control method in an ATM network system in which a plurality of ATM-LANs are connected through an ATM-WAN and each of said ATM-LANs includes one or more ATM switches and terminals connected to each of said ATM switches, comprising:

a first judgment step of judging, in response to a request for setting an ATM connection through at least one ATM switch between a source terminal and a destination terminal whether the ATM-LAN to which the destination terminal is connected and the ATM-LAN including said at least one ATM switch are the same as each other or not;

a first memory step of storing in said at least one ATM switch information indicating that a fast reservation protocol mechanism is selected as a congestion control system in response to the fact that a judgment result of said first judgment step is affirmative;

a second memory step of storing in said at least one ATM switch information indicating that a backward explicit congestion notification mechanism is selected as the congestion control system in response to the fact that a judgment result of said first judgment step is negative; and an execution step of executing control of congestion according to the stored information indicating a selected congestion control system in response to occurrence of congestion relative to said ATM connection in said at least one ATM switch.

6. In an ATM network system in which a plurality of ATM-LANs are connected through an ATM-WAN and each of said ATM-LANs includes one or more ATM switches and terminals connected to each of said ATM switches, at least one ATM switch comprising:

first judgment means for judging whether an ATM-LAN to which a destination terminal is connected and an ATM-LAN to which said at least one ATM switch belongs are the same as each other or not in response to a request for setting an ATM connection between the source terminal and the destination terminal;

first memory means for storing information indicating that a fast reservation protocol mechanism is selected as a congestion control system in response to the fact that a judgment result of said first judgment means is affirmative;

second memory means for storing information indicating that a backward explicit congestion notification mechanism is selected as a congestion control system in response to the fact that a judgment result of said first judgment means is negative; and execution means for executing control of congestion according to the stored information indicating a selected congestion control system in response to occurrence of congestion relative to said ATM connection in said at least one ATM switch.

* * * * *